(12) United States Patent
Kurosawa

(10) Patent No.: US 8,429,703 B2
(45) Date of Patent: Apr. 23, 2013

(54) VIDEO DISTRIBUTION APPARATUS, VIEWER APPARATUS, VIDEO DISTRIBUTION SYSTEM INCLUDING THESE APPARATUSES, CONTROL METHOD FOR THE VIDEO DISTRIBUTION APPARATUS, CONTROL METHOD FOR THE VIEWER APPARATUS, AND COMPUTER PROGRAM FOR THE APPARATUSES

(75) Inventor: Takahiro Kurosawa, Kunitachi (JP)

(73) Assignee: Canon Kabushi Kaisha, Tokyo (JP)

( * ) Notice: Subject to any disclaimer, the term of this patent is extended or adjusted under 35 U.S.C. 154(b) by 406 days.

(21) Appl. No.: 11/558,964

(22) Filed: Nov. 13, 2006

(65) Prior Publication Data

US 2007/0113255 A1 May 17, 2007

(30) Foreign Application Priority Data

Nov. 16, 2005 (JP) .................................. 2005-332058
Aug. 11, 2006 (JP) .................................. 2006-220643

(51) Int. Cl.
*H04N 7/173* (2006.01)

(52) U.S. Cl.
USPC ........ 725/105; 348/207.1; 348/143; 348/152; 348/156; 348/211.99; 348/211.1; 348/211.2; 348/211.3; 348/211.4; 348/211.5; 348/211.6; 348/211.7; 348/211.8; 348/211.9; 348/211.11; 348/211.12; 348/211.13; 348/211.14

(58) Field of Classification Search ................... 725/105; 348/207.1, 143, 152, 156, 211.99–211.14, 348/218.1, 36–39
See application file for complete search history.

(56) References Cited

U.S. PATENT DOCUMENTS

| | | | |
|---|---|---|---|
| 4,951,125 A * | 8/1990 | Kojima et al. | 348/580 |
| 6,005,613 A * | 12/1999 | Endsley et al. | 348/231.6 |
| 7,362,966 B2 * | 4/2008 | Uchiyama | 396/60 |
| 2001/0040636 A1* | 11/2001 | Kato et al. | 348/333.03 |
| 2002/0122113 A1* | 9/2002 | Foote | 348/48 |
| 2005/0285950 A1* | 12/2005 | Oya | 348/211.4 |
| 2006/0078329 A1* | 4/2006 | Ohnishi et al. | 396/429 |

FOREIGN PATENT DOCUMENTS

JP 06-205409 A 7/1994
JP 09-261522 10/1997

(Continued)

OTHER PUBLICATIONS

Jan. 13, 2012 Japanese Office Action, which is enclosed without an English Translation, that issued in Japanese Patent Application No. 2006-220643.
Mar. 26, 2012 Japanese Office Action, which is enclosed without English Translation, that issued in Japanese Patent Application No. 2006-220643.

*Primary Examiner* — Roberto Velez
*Assistant Examiner* — Yih-Sien Kao
(74) *Attorney, Agent, or Firm* — Cowan, Liebowitz & Latman, P.C.

(57) ABSTRACT

A video distribution system which is enhanced in flexibility in distribution mode switching. In a camera server connected to a viewer via a network, a video capture board captures a video image. A CPU processes the captured video image according to an electronic PTZ mode for cutting out a part of the captured video image and a mechanical PTZ emulation mode for cutting out parts of the captured video image and interpolating the cut-out images. The CPU distributes the processed video image to the viewer via the network. The CPU performs mode switching between the electronic PTZ mode and the mechanical PTZ emulation mode based on control information transmitted from the viewer.

14 Claims, 20 Drawing Sheets

FOREIGN PATENT DOCUMENTS

| | | |
|---|---|---|
| JP | 09-289607 | 11/1997 |
| JP | 10-136246 A | 5/1998 |
| JP | 10-200807 A | 7/1998 |
| JP | 2004-254031 A | 9/2004 |

* cited by examiner

FIG. 13

| [OPERATION COMPONENT] | [OPERATION MODE] |
|---|---|
| PRESET SELECTION SELECT BOX | ELECTRONIC PTZ MODE |
| VIDEO DISPLAY AREA | ELECTRONIC PTZ MODE |
| BUTTON FOR DESIGNATING POSITION FROM PANORAMA IMAGE | ELECTRONIC PTZ MODE |
| CAMERA SELECTION MENU | ELECTRONIC PTZ MODE |
| IMAGE SIZE CHANGE MENU | ELECTRONIC PTZ MODE |
| PAN SLIDE BAR | MACHANICAL PTZ EMULATION MODE |
| TILT SLIDE BAR | MACHANICAL PTZ EMULATION MODE |
| ZOOM SLIDE BAR | MACHANICAL PTZ EMULATION MODE |

FIG. 16

| [CONTROL INFORMATION ITEM] | [OPERATION MODE] |
| --- | --- |
| SelectPreset | ELECTRONIC PTZ MODE |
| OperateCameraOnScreen | ELECTRONIC PTZ MODE |
| OperateCameraOnPanorama | ELECTRONIC PTZ MODE |
| SelectCamera | ELECTRONIC PTZ MODE |
| ChangeImageSize | ELECTRONIC PTZ MODE |
| OperateCamera | MACHANICAL PTZ EMULATION MODE |
| CameraPosition | MACHANICAL PTZ EMULATION MODE |
| CameraControl | MACHANICAL PTZ EMULATION MODE |

VIDEO DISTRIBUTION APPARATUS, VIEWER APPARATUS, VIDEO DISTRIBUTION SYSTEM INCLUDING THESE APPARATUSES, CONTROL METHOD FOR THE VIDEO DISTRIBUTION APPARATUS, CONTROL METHOD FOR THE VIEWER APPARATUS, AND COMPUTER PROGRAM FOR THE APPARATUSES

BACKGROUND OF THE INVENTION

1. Field of the Invention

The present invention relates to a video distribution technique for distributing a video image via a network.

2. Description of the Related Art

Recently, a video distribution system for distributing live video images over a network, such as the Internet, has been emerging on the scene. In such a system, it is desirable that a viewer apparatus can perform camera control operations, such as panning, tilting, zooming, and backlight correction, on a camera server.

Panning, tilting, and zooming operations (these three operations are also sometimes collectively referred to as "PTZ" using their first letters) are performed by a conventional mechanical method (mechanical PTZ) or an electronic method (electronic PTZ) based on image processing. In the mechanical PTZ, a panning, tilting, or zooming operation is performed by driving an optical system of lenses and the like, and a panhead mechanism, by motor(s). On the other hand, in the electronic PTZ, a partial image is cut out from a picked-up wide-range image, and then the cut-out image is subjected to image processing, whereby a desired panned, tilted, or zoomed image is obtained (see Japanese Laid-Open Patent Publication Nos. H09-289607 and H09-261522).

The electronic PTZ is advantageous in that the panhead mechanism indispensable to the mechanical PTZ can be dispensed with. However, in general, the electronic PTZ cannot provide a video image (intermediate video image) picked up during the panning, tilting, or zooming operation, which the mechanical PTZ can provide. To solve this problem, there has been proposed a related technique called the mechanical PTZ emulation. The related technique makes it possible to form an intermediate video image from images immediately before and after application of the panning, tilting, or zooming operation, by interpolation, and distribute the intermediate video image.

However, in the conventional video distribution system, it is impossible to perform flexible switching between an electronic PTZ distribution mode and a mechanical PTZ emulation distribution mode. The other problems with the prior art will become apparent from the overall description of the present specification.

SUMMARY OF THE INVENTION

It is an object of the present invention to provide a video distribution apparatus, a viewer apparatus, and a video distribution system including these apparatuses, which are enhanced in flexibility in distribution mode switching, as well as a control method for the video distribution apparatus, a control method for the viewer apparatus, and a computer program for the apparatuses.

To attain the above object, in a first aspect of the present invention, there is provided a video distribution apparatus that is connected via a network to a viewer apparatus that displays a video image, comprising a video capture device that captures a video image, a video processing device that processes the captured video image according to a first mode for cutting out a part of the captured video image and a second mode for cutting out parts of the captured video image and interpolating the cut-out images, a distribution device that distributes the processed video image to the viewer apparatus via the network, and a mode switching device that performs mode switching between the first mode and the second mode based on control information sent from the viewer apparatus.

Preferably, the first mode is a video mode for generating an electronically panned, tilted, or zoomed video image, and the second mode is a video mode for generating an electronically panned, tilted, or zoomed video image, and generating an intermediate video image from the video images captured before and after being panned, tilted, or zoomed by the interpolation.

Preferably, the mode switching device performs the mode switching between the first mode and the second mode based on mode designating information sent from the viewer apparatus.

Alternatively, the mode switching device includes a storage device that stores a mapping table in which are registered correspondences between items of the control information sent from the viewer apparatus and the mode to be selected, and a determination device that determines the first mode or the second mode as the mode to be selected, from the mapping table based on control information sent from the viewer apparatus.

To attain the above object, in a second aspect of the present invention, there is provided a viewer apparatus that displays a video image distributed from a video distribution apparatus connected thereto via a network, comprising a transmission device that transmits mode designating information designating one of a first mode for cutting out a part of a video image and a second mode for cutting out parts of the video image and interpolating the cut-out images, to the video distribution apparatus, a receiving device that receives a video image generated by the video distribution apparatus based on the mode designating information, from the video distribution apparatus, and a display device that displays the received video image on a display screen.

Preferably, the display device displays a viewer interface having a plurality of operating controls provided thereon on the display screen, and the viewer apparatus further comprising a determination device that determines the mode designating information to be transmitted to the video distribution apparatus according to an operation of the at least one of the operating controls.

More preferably, the determination device includes a storage device that stores a mapping table in which are registered correspondences between items of the operating controls and the mode designating information to be transmitted.

More preferably, the determination device determines the mode designating information based on different operation styles applied to the operating controls.

To attain the above object, in a third aspect of the present invention, there is provided a video distribution system including a video distribution apparatus and a viewer apparatus interconnected via a network, wherein the video distribution apparatus comprises a video capture device that captures a video image, a video processing device that processes the captured video image according to a first mode for cutting out a part of the captured video image and a second mode for cutting out parts of the captured video image and interpolating the cut-out images, a distribution device that distributes the processed video image to the viewer apparatus via the network, and a mode switching device that performs mode switching between the first mode and the second mode based on control information transmitted from the viewer apparatus, and the viewer apparatus comprises a transmission device that transmits mode designating information designating one of the first mode for cutting out a part of a video image and the second mode for cutting out parts of the video image and interpolating the cut-out images to the video distribution apparatus, a receiving device that receives the video image distributed by the distribution device of the video distribution apparatus, which are generated based on the mode designating information by the video distribution apparatus, and a display device that displays the received video image on a display screen.

To attain the above object, in a fourth aspect of the present invention, there is provided a method of controlling a video distribution apparatus that is connected via a network to a viewer apparatus that displays a video image, comprising a video capture step of capturing a video image, a video processing step of processing the captured video image according to a first mode for cutting out a part of the captured video image and a second mode for cutting out parts of the captured video image and interpolating the cut-out images, a distribution step of distributing the processed video image to the viewer apparatus via the network, and a mode switching step of performing mode switching between the first mode and the second mode based on control information transmitted from the viewer apparatus.

To attain the above object, in a fifth aspect of the present invention, there is provided a method of controlling a viewer apparatus that displays a video image distributed from a video distribution apparatus connected thereto via a network, comprising a transmission step of transmitting mode designating information designating one of a first mode for cutting out a part of a video image and a second mode for cutting out parts of the video image and interpolating the cut-out images to the video distribution apparatus, a reception step of receiving a video image generated by the video distribution apparatus based on the mode designating information from the video distribution apparatus, and a display step of displaying the received video image on a display screen.

To attain the above object, in a sixth aspect of the present invention, there is provided a computer program executed by a video distribution apparatus that is connected via a network to a viewer apparatus that displays a video image, comprising a video capture module for capturing a video image, a video processing module for processing the captured video image according to a first mode for cutting out a part of the captured video image and a second mode for cutting out parts of the captured video image and interpolating the cut-out images, a distribution module for distributing the processed video image to the viewer apparatus via the network, and a mode switching module for performs mode switching between the first mode and the second mode based on control information transmitted from the viewer apparatus.

To attain the above object, in a seventh aspect of the present invention, there is provided a computer program executed by a viewer apparatus that displays a video image distributed from a video distribution apparatus connected thereto via a network, comprising a transmission module for transmitting mode designating information designating one of a first mode for cutting out a part of a video image and a second mode for cutting out parts of the video image and interpolating the cut-out images to the video distribution apparatus, a reception module for receiving a video image generated by the video distribution apparatus based on the mode designating information from the video distribution apparatus, and a display module for displaying the received video image on a display screen.

With the configuration of the present invention, it is possible to flexibly switch between the first mode in which a part of a captured video image is cut out and the second mode in an image is generated based on cut-out images by interpolation.

The above and other objects, features, and advantages of the invention will become more apparent from the following detailed description taken in conjunction with the accompanying drawings.

BRIEF DESCRIPTION OF THE DRAWINGS

FIG. 13 is a view of an example of a mapping table stored in a memory appearing in FIG. 4;

FIG. 16 is a view of an example of a mapping table used in the second embodiment, which is stored in a memory appearing in FIG. 3.

DETAILED DESCRIPTION OF THE PREFERRED EMBODIMENTS

The present invention will now be described in detail with reference to the drawings showing preferred embodiments thereof.

It is to be understood that the embodiments described hereafter will be useful in understanding the concepts of the present invention, such as the superordinate, coordinate, and subordinate ones thereof. Further, the technical scope of the present invention is defined by the scope of the appended claims, and is not limited to only the specific descriptions in this specification.

In the embodiments of the present invention, video images are distributed from an electronic PTZ function-equipped video distribution apparatus (e.g. a camera server or a network camera) via a network to viewer apparatuses (e.g. PCs executing a viewer program). Particularly in a first embodiment, a description will be given of a method of carrying out video mode switching e.g. between an electronic PTZ mode and a mechanical PTZ emulation mode based on control information (e.g. a request or a command) sent from a viewer apparatus according to operations by an operator.

In the following description, mode switching is performed in response to an operation of an operating control (e.g. a scroll bar or a select box) as a part of a viewer interface. It should be noted that correspondences between operating controls (also referred to as "operating components") and mode designating information items) are stored e.g. in a mapping table provided in the viewer apparatus.

Figure 1:
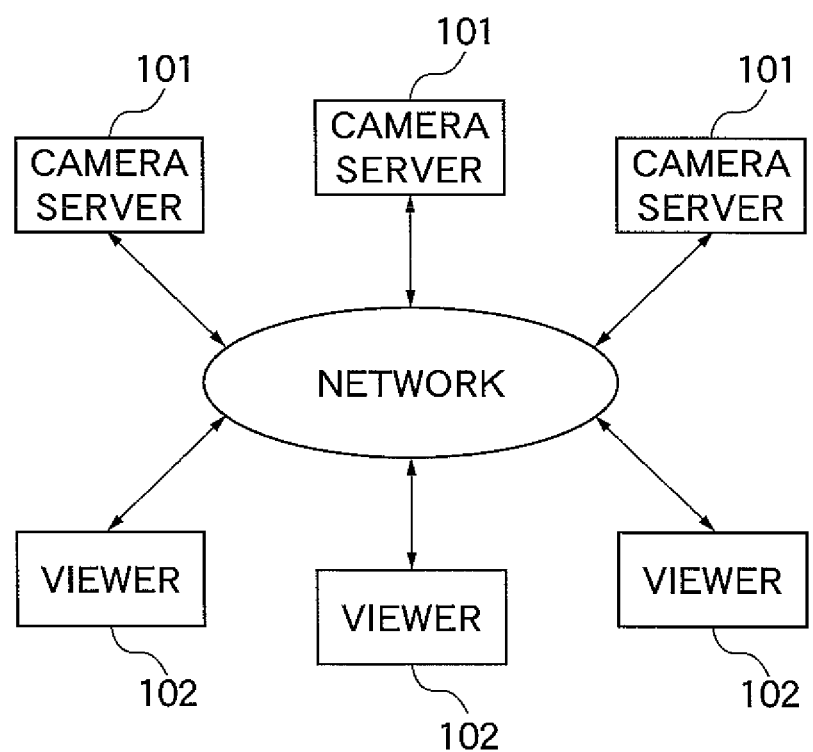
FIG. 1 is a block diagram of an example of the configuration of a video distribution system according to a first embodiment of the present invention.

FIG. 1 is a block diagram of an example of the configuration of a video distribution system according to the first embodiment.

The video distribution system shown in FIG. 1 includes video distribution apparatuses and viewer apparatuses each connected to a network. Each camera server 101 is an example of the video distribution apparatus. Each viewer 102 is an example of the viewer apparatus. The camera servers 101 and the viewers 102 are connected to the network. When a camera server 101 receives a request from a viewer 102, the camera server 101 distributes video data to the viewer 102. The viewer 102 displays the received video data.

The viewer 102 can send a camera control command for zooming, panning, or tilting to the camera server 101. The camera server 101 carries out the electronic PTZ or the mechanical PTZ emulation in response to the received camera control command. It should be noted that the network may be implemented by an intranet or the Internet.

Figure 2:
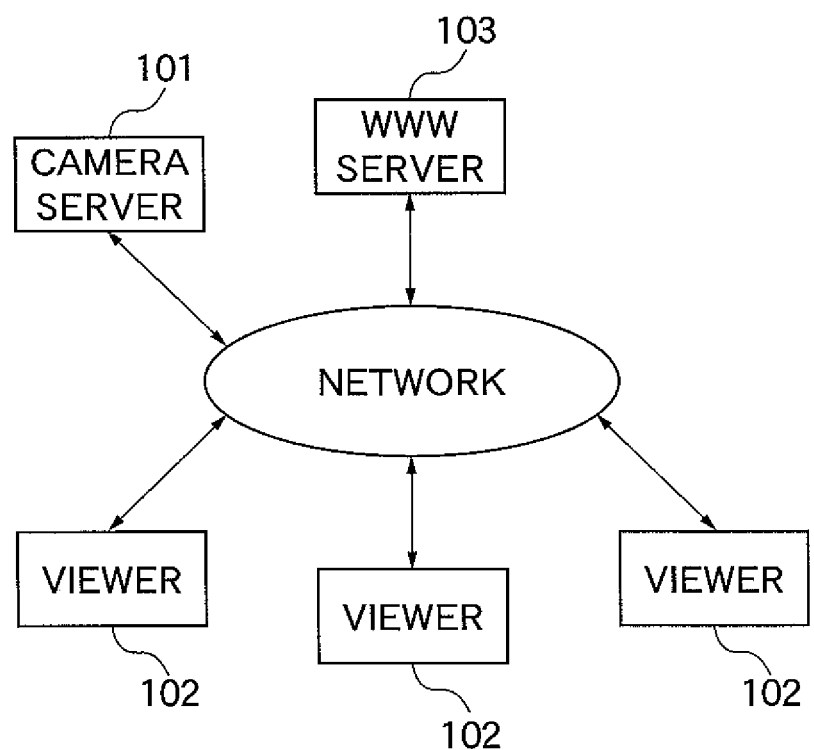
FIG. 2 is a block diagram of a variation of the video distribution system in FIG. 1.

FIG. 2 is a block diagram of a variation of the video distribution system in FIG. 1. This system employs a well-known Web technology. A WWW server 103 can provide each viewer 102 with Web page data containing a link to camera server 101. The viewer 102 can establish connection to a desired camera server, e.g. the camera server 101, by designating a desired link destination. The WWW server 103 may be integrated in the camera server 101.

Figure 3:
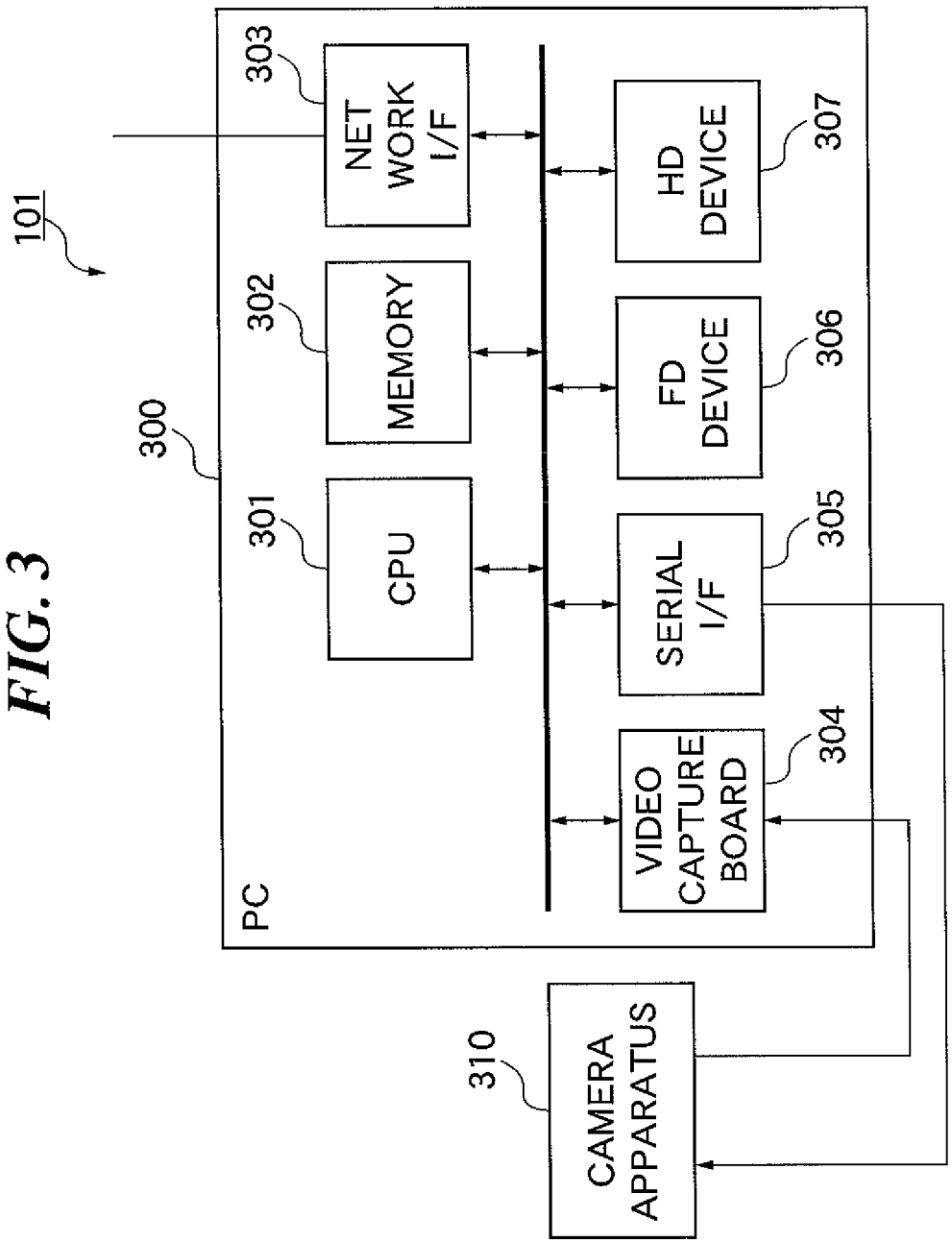
FIG. 3 is a block diagram an example of the hardware configuration of a camera server appearing in FIG. 1.

FIG. 3 is a block diagram of an example of the hardware configuration of a camera server 101 appearing in FIG. 1. The camera server 101 is comprised of a personal computer (PC) 300 and a camera apparatus 310.

The PC 300 is comprised of a CPU 301, a memory 302, a network I/F 303, a video capture board 304, a serial I/F 305, an FD device (flexible disk device) 306, and an HD device (hard disk device) 307. The CPU 301 executes various processes based on computer programs. The memory 302 is a storage device, such as a ROM or a RAM. The network I/F 303 is a communication unit for establishing connection to the network. The video capture board 304 is a video processing unit for capturing video data from the camera apparatus 310.

The serial I/F 305 is a communication unit for sending control information, such as requests and commands, to the camera apparatus 310. The FD device 306 is a drive for installing the computer program stored in a flexible disk, in the HD device 307. The HD device 307 is a hard disk drive. The camera apparatus 310 is a video capture unit including an optical system that includes optical lenses, such as a wide-angle lens, and an image pickup element that captures an optical image of an object to form a video signal. The optical system may use a rotary hyperbolic reflector or the like as an alternative to the wide-angle lens or a fish-eye lens.

Figure 4:
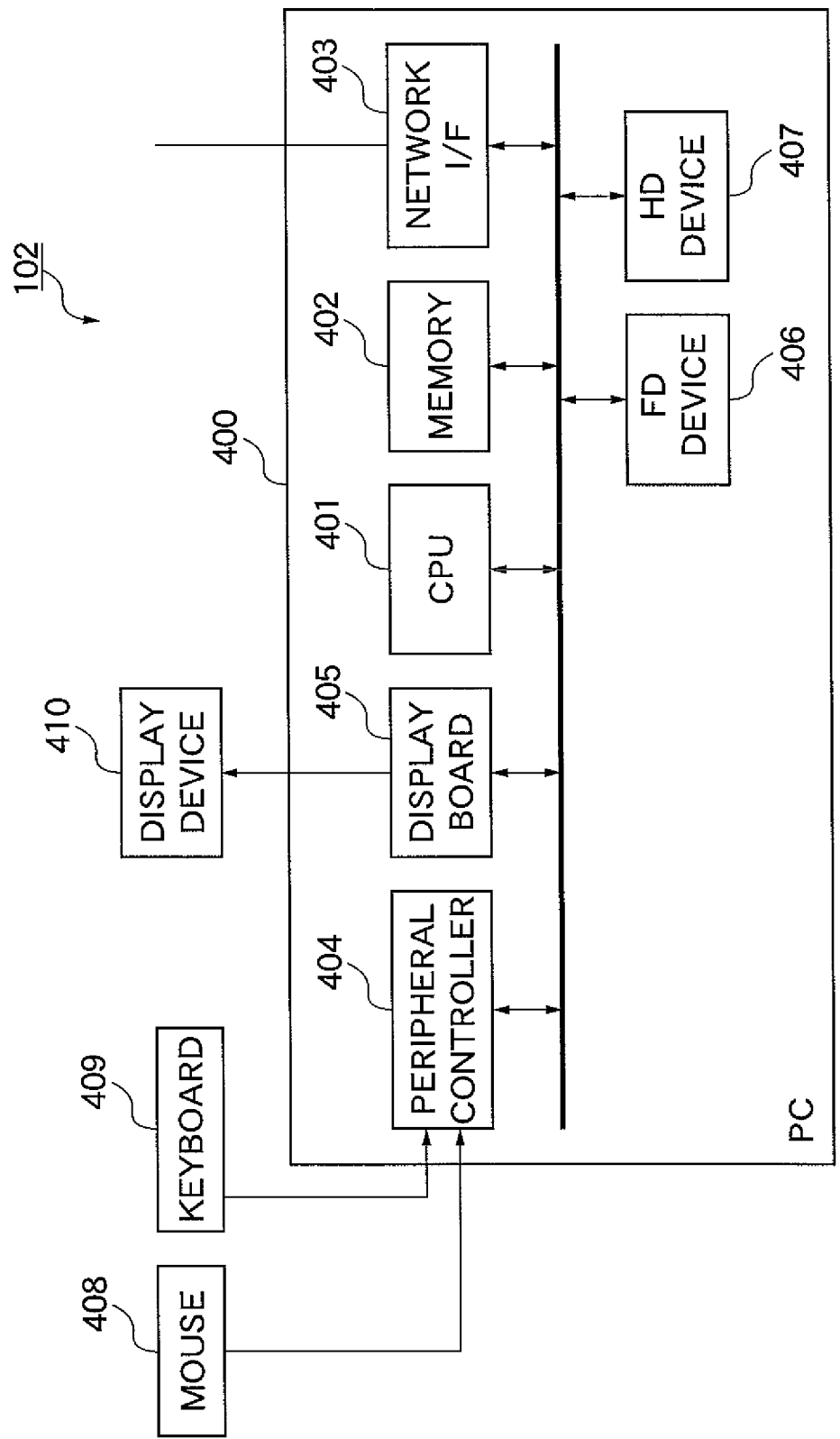
FIG. 4 is a block diagram of an example of the hardware configuration of a viewer appearing in FIG. 1.

FIG. 4 is a block diagram of an example of the hardware configuration of a viewer 102 appearing in FIG. 1. Each viewer 102 can be implemented by a general PC.

A PC 400 is comprised of a CPU 401, a memory 402, a network I/F 403, a peripheral controller 404, a display board 405, an FD device 406 and an HD device 407. The CPU 401 executes various processes based on computer programs. The memory 402 is a storage device, such as a ROM or a RAM. The network I/F 403 is a communication unit for establishing connection to the network.

Connected to the peripheral controller 404 are input units, such as a mouse 408 and a keyboard 409, for use in input operation by an operator. The display board 405 is connected to a display device 410 that displays video images and a user interface (UI) for the operator.

Figure 5:
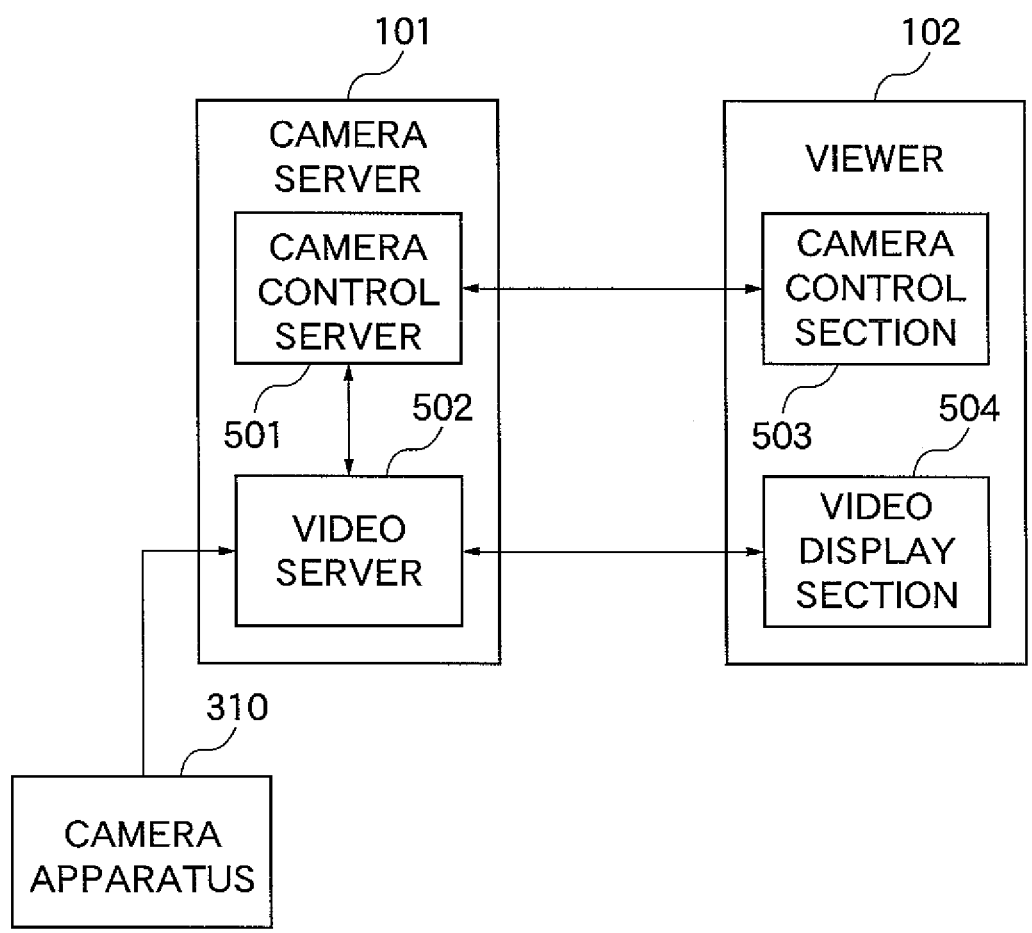
FIG. 5 is a block diagram of an example of the configuration of modules of the video distribution system in FIG. 1.

FIG. 5 is a block diagram of an example of the configuration of modules of the video distribution system in FIG. 1. The camera server 101 includes a camera control server 501 controlling the camera apparatus 310, and a video server 502 controlling image processing and distribution of video images. The camera apparatus 310 of the camera server 101 is connected to the video server 502. The viewer 102 includes a camera control section 503 that sends control information to the camera server 101 and processes status information from the camera server 101, and a video display section 504 that displays video images from the camera apparatus 310.

The camera control server 501 stores field-of-view information, described hereinafter, of viewers 102 connected thereto in the memory 302 on a viewer-by-viewer basis. The camera control server 501 changes field-of-view information based on control information from the viewer 102. The video server 502 carries out coordinate transformation, video image cutting-out, image correction, and so forth based on the field-of-view information stored on a viewer-by-viewer basis.

Field-of-view information indicates the position and size of a video image to be cut out in an entire field of view indicative of an range of an object image which can be picked up by the camera apparatus 310 using the optical system (which will be described in detail hereinafter with reference to FIG. 10). In addition to the field-of-view information, the video server 502 stores information on image quality levels (e.g. bit rates, compression ratios), resolutions, distribution methods (e.g. codecs, distribution protocols), and so forth in the memory 302 on a viewer-by-viewer basis. The video server 502 processes a video image based on the information items, and then sends the processed video image to the viewer 102.

Figure 6:
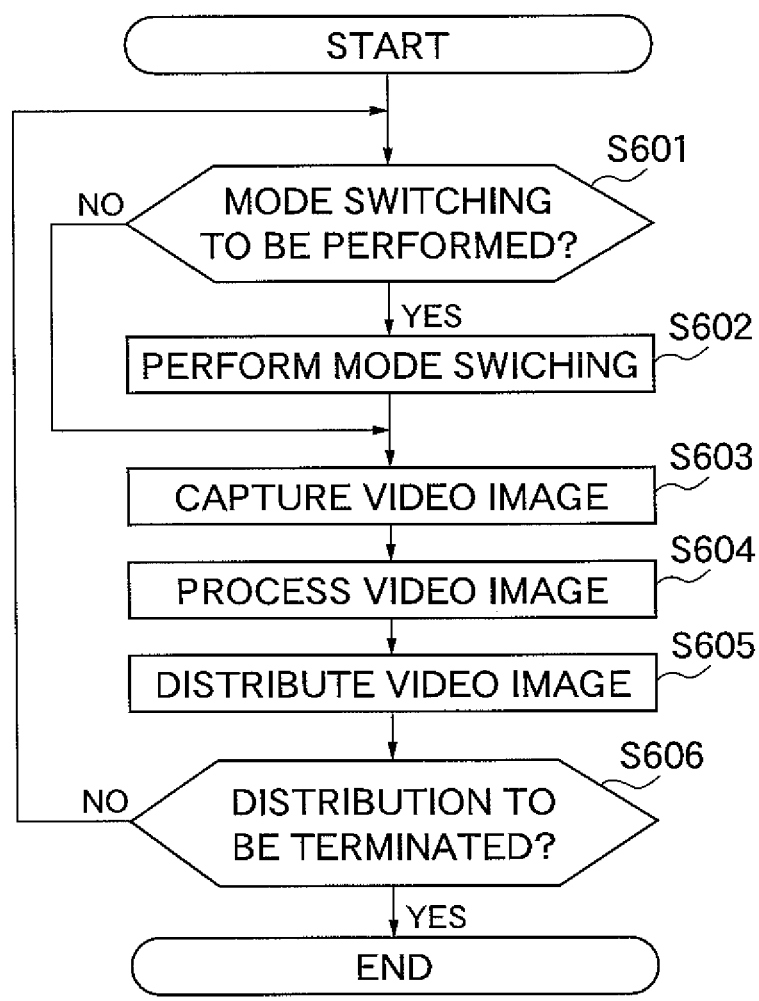
FIG. 6 is a flowchart of a control process executed by each camera server in FIG. 1.

FIG. 6 is a flowchart of a control process executed by each camera server in FIG. 1. In a step S601, the CPU 301 of the camera server 101 determines, based on control information received from a viewer 102 through the network I/F 303, whether or not mode switching is to be performed. The CPU 301 performs this determination e.g. by determining whether or not the control information contains mode designating information explicitly designating mode switching. Alternatively, as described in detail hereinafter in a second embodiment, the determination may be performed by the CPU 301 based on a mapping table in which correspondences between predetermined control information items and the modes are registered. The mapping table is stored e.g. in the memory 302 or the HD device 307. If it is determined in the step S601 that mode switching is to be performed, the CPU 301 further determines which mode is to be selected, followed by the process proceeding to a step S602. On the other hand, if mode switching is not to be performed, the process skips the step S602 over to a step S603.

In the step S602, the CPU 301 sends a video capture command to the video capture board 304. In response to this command, the video capture board 304 captures a video signal from the camera apparatus 310 and generates video data.

In a step S604, the video capture board 304 processes the generated video data in accordance with the mode selected by the CPU 301. For example, when the electronic PTZ mode is selected, the video capture board 304 cuts out a part out of the captured video image. In the mechanical PTZ emulation mode, the video capture board 304 further generates a video image (intermediate video image) based on a plurality of cut-out video images by interpolation. It should be noted that the interpolation carried out here includes cutting out one or more images (intermediate video images) positioned at respective one or more predetermined locations between respective image positions in a full field-of-view image before and after execution e.g. of a panning operation. In this case, the user can obtain a predetermined intermediate video image simply by designating an image position in the full field-of-view image at least after the panning operation, or by designating a panning speed, referred to hereinafter. This makes it unnecessary for the user to carry out a complicated operation for viewing the intermediate video image(s) generated by interpolation.

In a step S605, the CPU 301 distributes the processed video image to the viewer 102 via the network I/F 303. In a step S606, the CPU 301 determines whether or not distribution of the video image is to be terminated. If distribution of the video image is not to be terminated, the process returns to the step S601, whereas if distribution of the video image is to be terminated, the present process is terminated.

Figure 7:
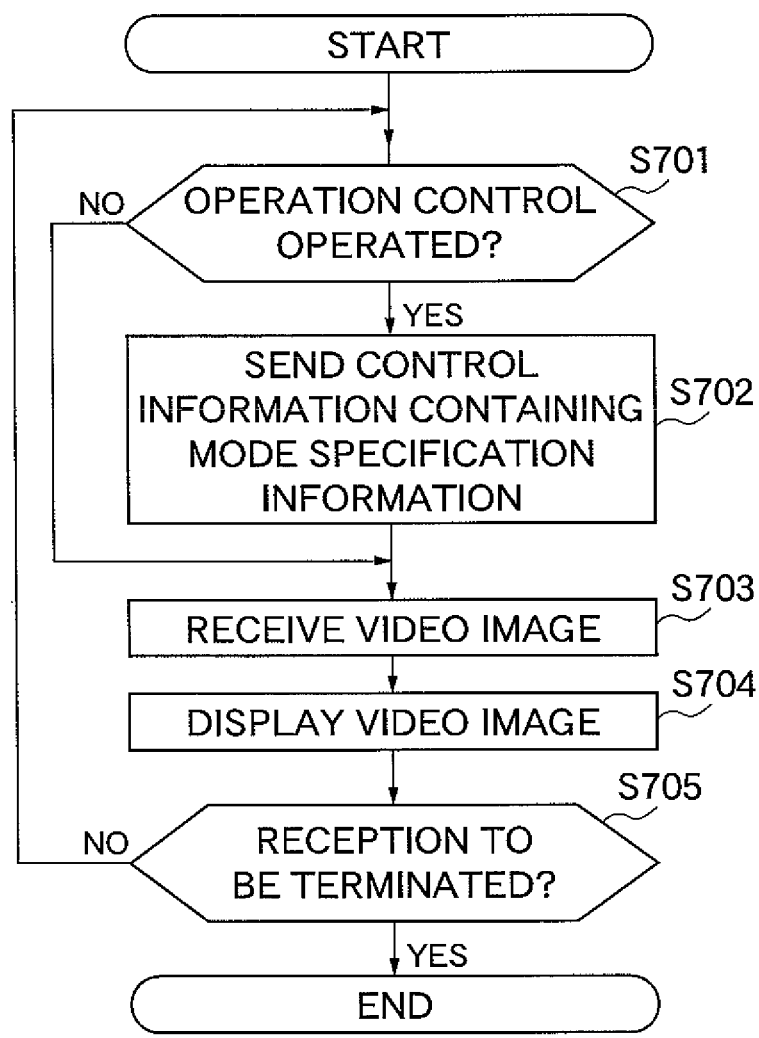
FIG. 7 is a flowchart of a control process executed by each viewer in FIG. 1.

FIG. 7 is a flowchart of a control process executed by each viewer 102 in FIG. 1. In a step S701, the CPU 401 detects by using the peripheral controller 404 whether or not an operating control for mode designation has been operated on the UI of the viewer 102. The operating control can be e.g. a scroll bar for panning, tilting, or zooming. If it is determined in the step S701 that an operating control for mode designation has been operated, the process proceeds to a step S702. If no operating control has been operated for mode designation, the process skips the step S702 over to a step S703.

In the step S702, the CPU 401 sends control information including mode designating information for designating one of the electronic PTZ mode and the mechanical PTZ emulation mode as a video mode to the camera server 101 via the network I/F 403. A video mode to be designated as the mode designating information is determined depending on an operated operating control by the CPU 401. To determine the video mode, the CPU 401 may utilize a mapping table stored in the memory 402 or the HD device 407. It should be noted that when the camera server 101 has a mapping table, as described hereinafter in the second embodiment, the mode designating information is not required to be included in the control information.

In the step S703, the CPU 401 receives video data from the camera server 101 via the network I/F 403. The video image of the data can include an intermediate video image processed based on the control information sent from the viewer 102.

In a step S704, the CPU 401 delivers the received video image to the display board 405, whereby the video image is displayed on the display device 410. In a step S705, the CPU 401 determines whether or not to terminate the reception of the video image. If the reception of the video image is not to be terminated, the process returns to the step S701, whereas if the reception of the video image is to be terminated, the present process is terminated.

Figure 8:
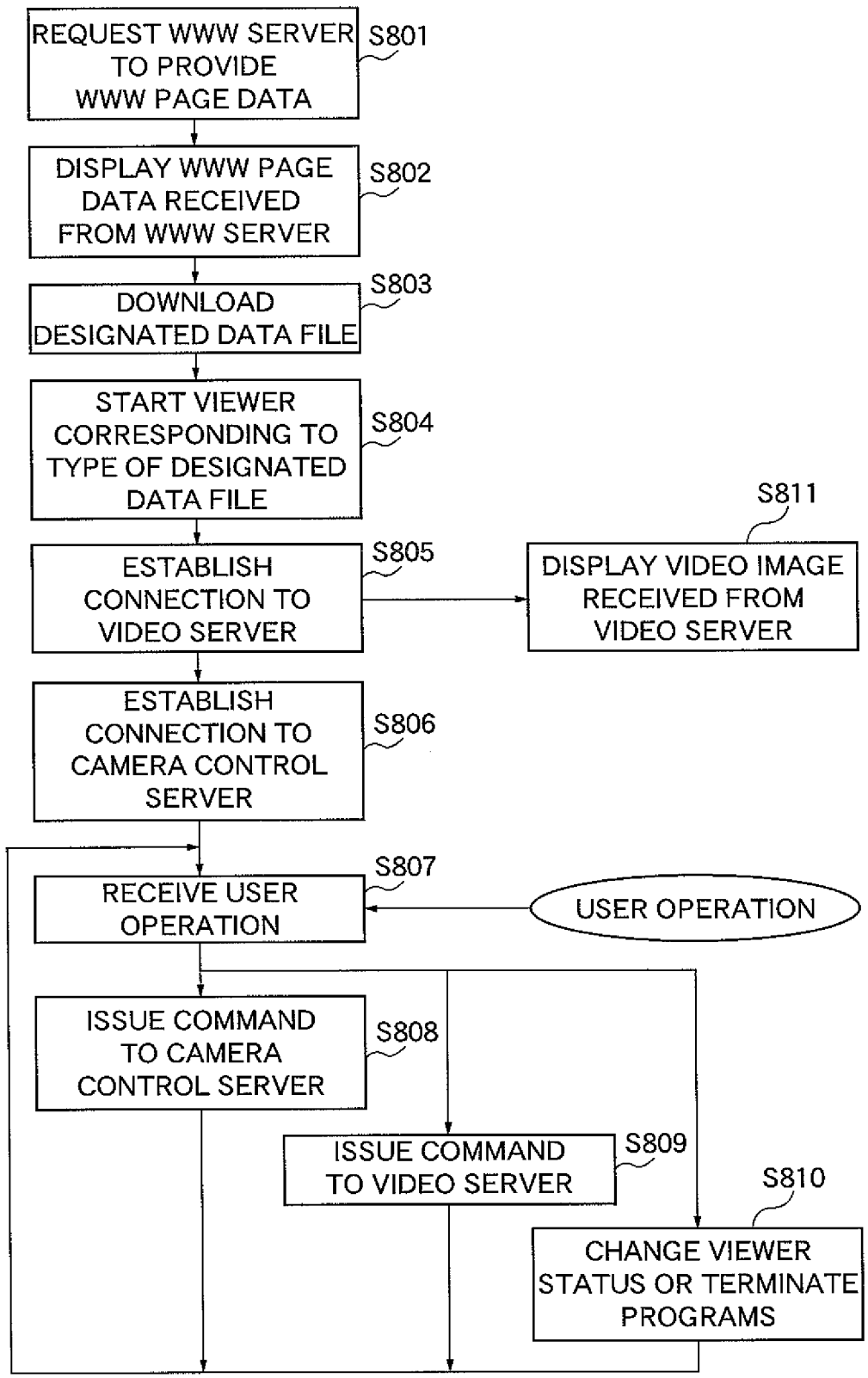
FIG. 8 is a flowchart of an operation carried out by the viewer in FIG. 1 based on a computer program.

FIG. 8 is a flowchart of an operation carried out by the viewer 102 in FIG. 1 based on a computer program. Although in the following description, each step is described as an operation of a computer program or a program module, it is to be understood that the CPU 401 is an execution entity of hardware that executes the program. It is assumed that the camera control section 503 and the video display section 504 are realized by a Web browser program (hereinafter referred to as "the Web browser"). It should be noted that Java (registered trademark) software, video plug-in software, or application software may operate in a manner associated with the Web browser.

In a step S801, the Web browser connects to the WWW server 103 appearing in FIG. 2, which corresponds to a URL designated as a link destination e.g. via the keyboard 409. It should be noted that the WWW server 103 may operate on the PC 300 of the camera server 101, or on another PC. Then, the Web browser requests the WWW server 103 to provide Web page data described e.g. in a description language such as HTML.

In a step S802, the Web browser receives the Web page data from the WWW server 103 and starts to display the Web page of the data. For example, the received Web page data may contain information for starting a program associated with a viewer (viewer program) and information required for establishing connection to a camera server 101. This information can contain e.g. an embed tag shown below or a hyperlink having a function equivalent to that of the embed tag:

<embed src="camera1.wvp" width=480 height=320>.

In a step S803, the Web browser accesses the WWW server 103 to download a data file (e.g. camera1.wvp) specified by the embed tag.

In a step S804, the Web browser starts a program (e.g. the viewer program) associated with an identifier indicative of the type of the data file. In short, this viewer program functions as the video display section 504.

In a step S805, the viewer program connects to the video server 502 of the associated camera server 101. It is assumed that information on the address and connection port of the video server 502 constituting the camera server 101 is described in the data file downloaded in the step S803. Then, the viewer program starts a program module (e.g. a thread or a process) for carrying out processing following the connection. The program module and the viewer program continuously receive video data from the video server 502 and display the video image of the data until they are terminated in a step S811.

On the other hand, in a step S806, the viewer program functioning as the video display section 504 connects to the camera control server 501 via the camera control section 503. It is assumed that the data file downloaded in the step 803 contains information on the address and connection port of the camera control server 501.

In a step S807, the viewer program accepts an operation request input via the mouse 408 and the keyboard 409. If the operation request relates to camera control, then, in a step S808, the viewer program issues a request or command to the camera control server 501. If the operation request relates to the video server 502, then, in a step S809, the viewer program issues a request or command to the video server 502. Further, if the operation request is for a change of a viewer status (e.g. a display size), then, in a step S810, the viewer program updates an internal state thereof. It should be noted that if the operation request is for termination, the viewer program sequentially terminates programs related to respective operations of the viewer 102. When one of the steps S808 to S810 is completed, the viewer program returns to the step S807, wherein an operation request from the user is awaited.

Figure 9:
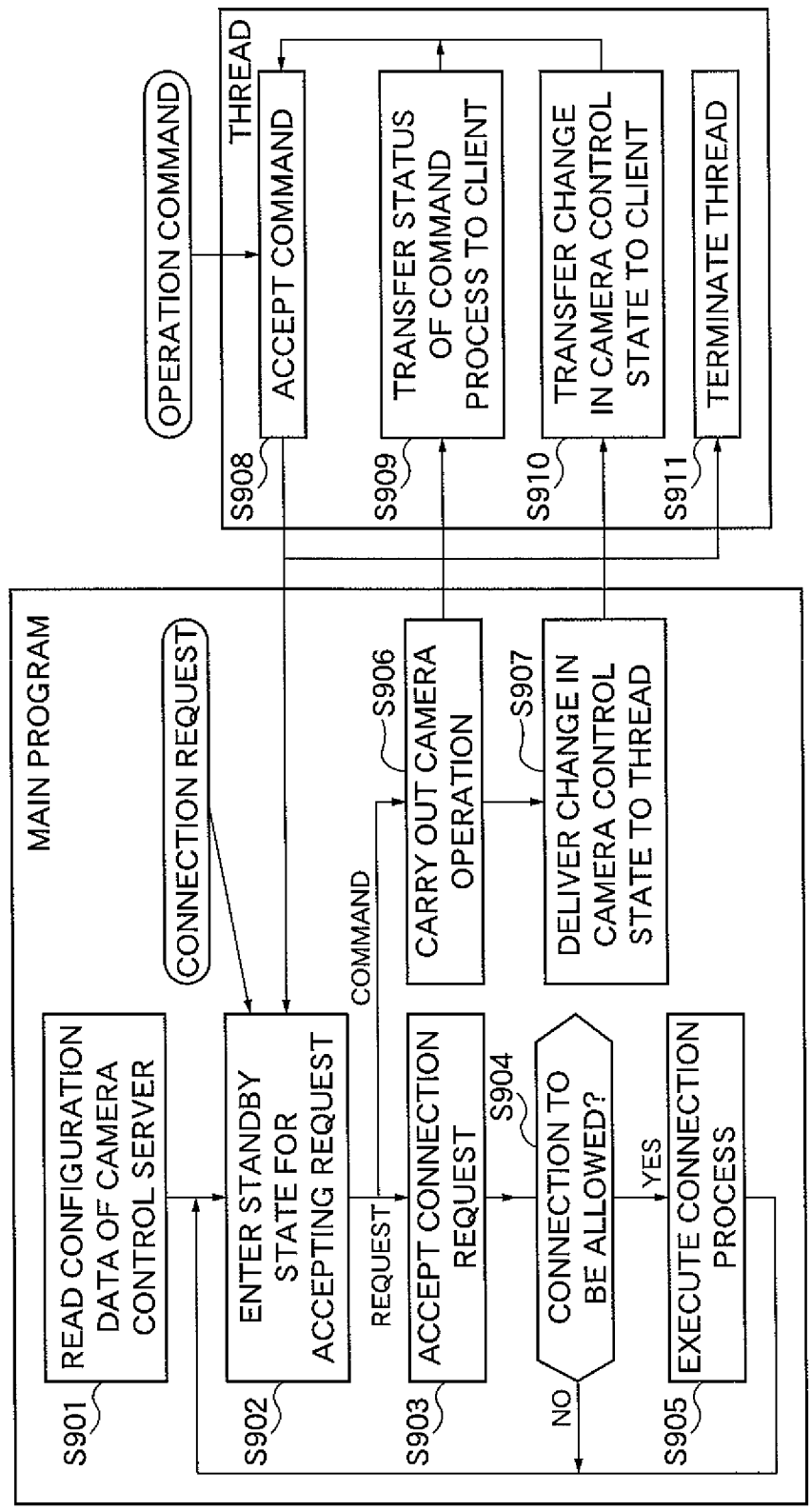
FIG. 9 is a flowchart of an example operation of a camera control server appearing in FIG. 5.

FIG. 9 is a flowchart of an example of the operation of the camera control server 501 appearing in FIG. 5. In a step S901, a main program for the camera control server 501 reads out configuration information from a specific file (e.g. a system database, such as a registry). Then, the camera control server 501 starts the operation based on the configuration information.

In a step S902, the camera control server 501 opens a port for accepting e.g. requests and commands from the viewer program of a viewer 102 as a client, whereby the camera control server 501 is placed in a standby state for accepting the requests and commands. Then, in the step S902, the camera control server 501 receives control information (e.g. a request or a command). If the control information is a connection request, in a step S903, the camera control server 501 accepts the connection request. In a step S904, the camera control server 501 determines whether or not to permit the connection. The camera control server 501 may make this determination e.g. by authentication of an ID and associated password.

If it is determined in the step S904 that the connection is to be rejected, the camera control server 501 sends an error code indicative of connection rejection to the client, and the program returns to the step S902. On the other hand, if the connection is to be allowed, the program proceeds to a step S905, wherein the camera control server 501 executes a connection process. In this process, the camera control server 501 sends a code indicative of connection permission to the client, and at the same time generates a processing thread (hereinafter simply referred to as "the thread" or "the client-associated thread") as a program module for accepting a command from the client in place of the main program. Further, the camera control server 501 registers the client, followed by the program returning to the step S902.

The thread generated in the step S905 accepts a command from the client in a step S908. This command may be contained in the connection request accepted in the step S903. More specifically, the thread delivers the accepted command to the main program for carrying out a camera operation, whereby the main program receives the command from the thread in the step S902. If the command relates to a camera operation, such as panning or tilting, the program proceeds to a step S906, wherein the main program carries out a camera operation corresponding to the operation command, and then delivers the result, i.e. a code containing information indicative of a command processing status such as success information or failure information on the camera operation to the thread to send the same to the client (viewer program). In a step S909, the client-associated thread transfers the result delivered from the main program to the client.

Further, in a step S907, the main program transmits information indicative of a status (e.g. values associated with panning, tilting, and zooming) changed by the camera operation, i.e. a change in the state of camera control to the client-associated thread. The client-associated thread transfers the change in the camera control state to the client in a step S910. After execution of the steps S909 and S910, the client-associated thread returns to the step S908, wherein the client-associated thread enters a standby state for receiving commands from the client. If a command for termination of connection from the client is received in the step S908, the client-associated thread delivers the command to the main program. Then, in a step S911, the thread terminates itself.

In the camera operation (step S906), the main program updates field-of-view information, which is stored for viewers connected to the camera server 101, on a viewer-by-viewer basis, according to the control information (command) from the viewer 102. More specifically, the main program updates the position and size of an image to be cut-out from a full field-of-view image corresponding to the full field of view. For example, in response to a panning operation command, the main program updates an x coordinate contained in the field-of-view information. In response to a tilting operation command, the main program updates a y coordinate contained in the field-of-view information. Further, in response to a zooming operation command, the main program updates size (width and height of the full field-of-view image) information contained in the field-of-view information.

Figure 10:
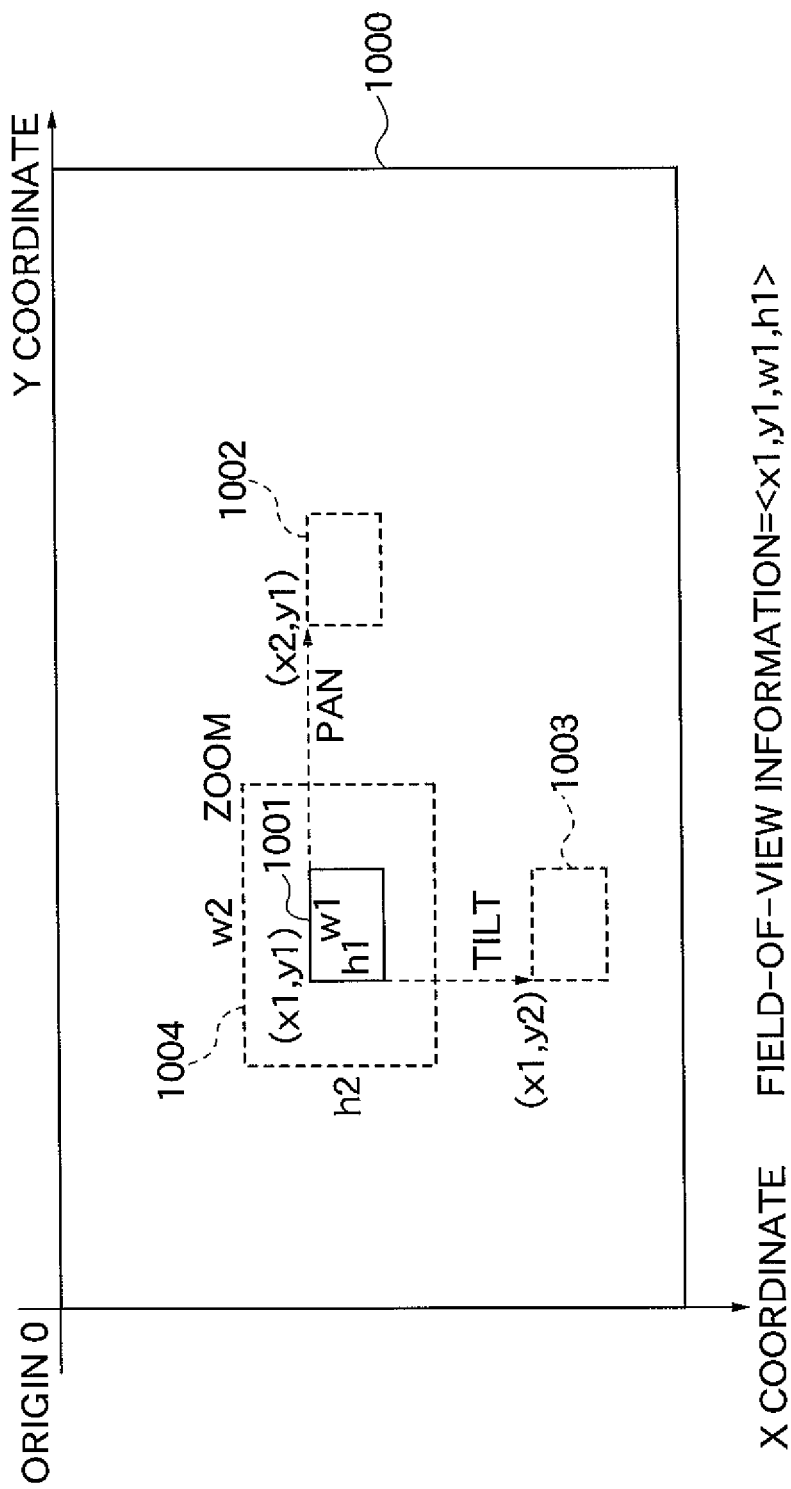
FIG. 10 is a diagram useful in explaining field-of-view information to be changed by a main program in a step S906 in FIG. 9.

FIG. 10 is a diagram useful in explaining the field-of-view information to be changed by the main program in the step S906 in FIG. 9. Reference numeral 1000 designates a full field-of-view image corresponding to a wide-angle range of an object whose image can be picked up using the optical system. Reference 1001 indicates a video image in a range designated based on the field-of-view information. When the x coordinate of the video image 1001 is changed in response to a panning operation command, the video image 1001 is switched to a video image 1002. When the y coordinate of the video image 1001 is changed in response to a tilting operation command, the video image 1001 is switched to a video image 1003. When the x and y coordinates of the video image 1001 are changed in response to a zooming operation command, the video image 1001 is switched to a video image 1004.

According to the first embodiment, each camera server 101 is provided with at least the electronic PTZ mode and the mechanical PTZ emulation mode, and the camera server 101 executes the camera control commands associated with the respective camera operations mentioned above, based on the mode designating information added to the control information. More specifically, when the electronic PTZ mode is designated, the camera server 101 immediately changes a video image. In other words, no intermediate video image is either generated or distributed.

On the other hand, when the mechanical PTZ emulation mode is designated, the camera server 101 changes a video image with the lapse of time at a predetermined rate. For example, let it be assumed that a panning operation with a panning angle of 15 degrees is requested by a viewer 102. If a panning rate of 60 degrees per second is set in advance at this time, the camera server 101 changes the x coordinate of field-of-view information over 0.25 seconds. In the example shown in FIG. 10, the x coordinate of the upper left corner of the video image 1001 is changed from x1 to x2, whereby the video image 1001 is switched to the video image 1002.

If a frame rate for video distribution is 30 fps at this time, it is necessary to stepwise change eight frames of video images to be generated after control of the camera apparatus 310 was requested in the field of view in the x-coordinate direction. Therefore, the video images of eight frames to be arranged between the video image 1001 and the video image 1002 are generated as intermediate video images by interpolation. For example, the video images of eight frames may be partial video images cut-out from the full field-of-view image 1000. In the present invention, such a cutting-out process should be also construed as a kind of interpolation.

It should be noted that a camera server 101 may allocate camera operation rights for operating the camera apparatus 310, before a command is issued from a viewer 102. This prevents the camera apparatus 310 from being operated by a viewer 102 which is not granted the camera operation rights, which makes it possible to suppress confusion or disorder caused when a plurality of viewers 102 simultaneously make respective requests for operations of the camera apparatus 310.

In this case, the camera control section 503 of a viewer 102 delivers a request command for acquiring the camera operation rights to the camera control server 501 of the camera server 101. The camera control server 501 selects rejection, allocation, or turn waiting based on the current allocation status of the camera operation rights, and sends the result of the selection to the camera control section 503.

The camera control server 501 may deprive a viewer 102 of the camera operation rights at the earlier one of a time a predetermined time period has elapsed and a time the connection is terminated by the viewer 102. In this case, the camera control server 501 gives the camera operation rights to a viewer 102 waiting its turn in the next place. The number of waiting users (viewers) may be limited to a predetermined number (e.g. five users or viewers). In this case, the camera control server 501 rejects requests from viewers 102 in excess of the predetermined number of viewers.

Figure 11:
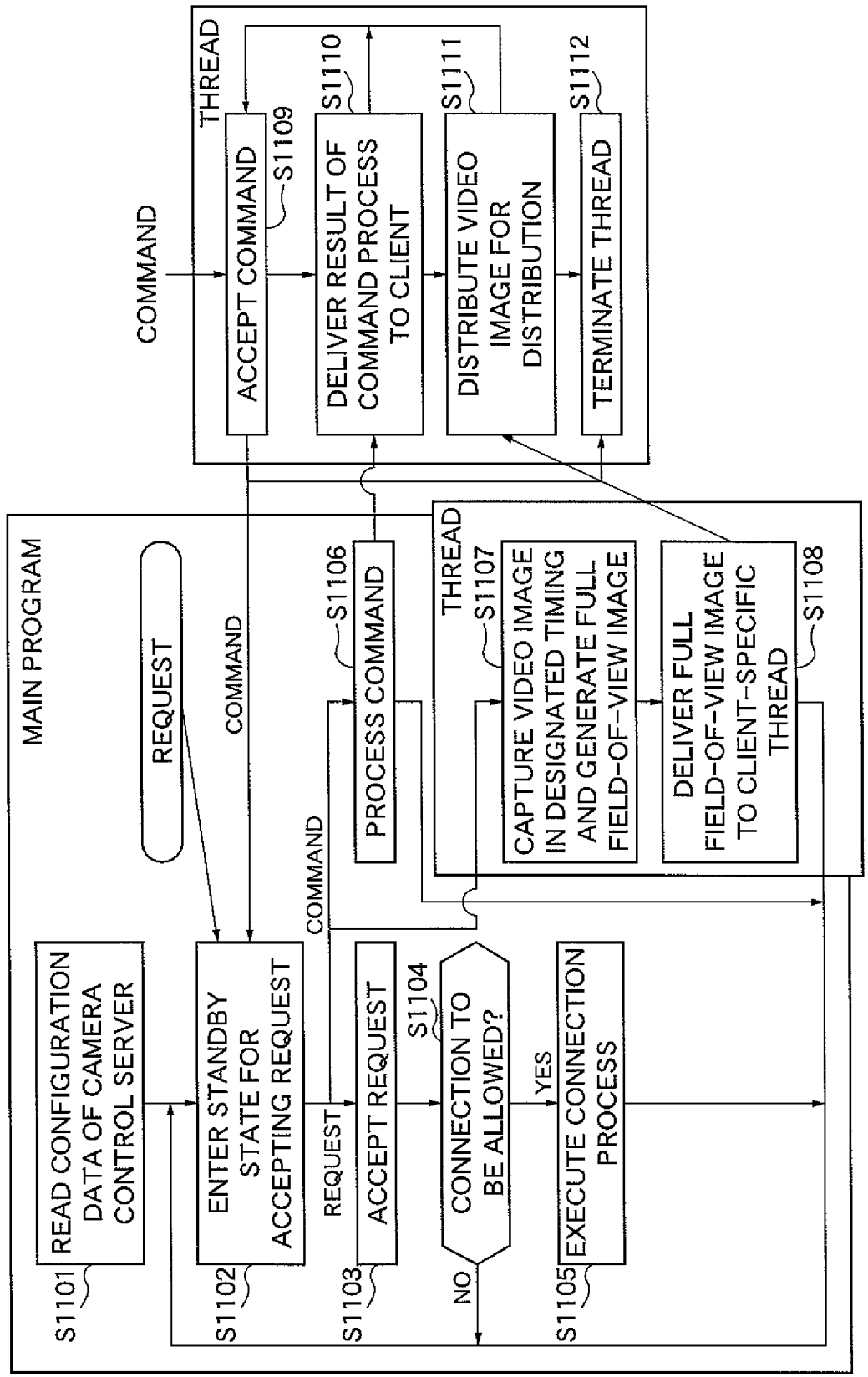
FIG. 11 is a flowchart of an example operation of a video server appearing in FIG. 5.

FIG. 11 is a flowchart of an example of the operation of the video server 502 appearing in FIG. 5. In the following, a description will be given mainly of software processing, but the CPU 301 is an execution entity that executes the processing.

In a step S1101, a main program for the video server 502 of the camera server 101 reads out configuration information on the video server 502 from a specific file (e.g. a system database, such as a registry), and starts operation based on the configuration information. Further, the video server 502 generates various threads. It is now assumed that the generated threads are initially in a sleep mode. The examples of the threads include a video capture thread and an encoding thread. It should be noted that these threads are generated for each viewer 102 as a client.

In a step S1102, the video server 502 opens a port for accepting requests and commands from the video display section 504 as a viewer program, whereby the video server 502 enters a standby state for receiving requests or commands. Then, when a connection request is received, for example, the main program proceeds to a step S1103, wherein the video server 502 accepts the connection request from a viewer 102. On the other hand, when a command is received in the step S1102, the main program proceeds to a step S1106.

In a step S1104, the video server 502 starts processing for the accepted connection request. The video server 502 determines whether or not to allow the connection. If the connection is not to be allowed, the video server 502 sends an error code indicative of connection rejection to the video display section 504.

On the other hand, if the connection is to be allowed, the main program proceeds to a step S1105, wherein the video server 502 carries out connection processing, and generates a thread for accepting a command from the video display section 504 of the viewer on behalf of the main program. The video server 502 registers identification information on the client having sent the connection request in a list for managing distributees of video images. Further, the video server 502 causes the video capture thread and the encoding thread in the sleep mode to start operating. Thereafter, the program returns to the step S1102.

In a step S1109, the thread accepts a command sent from the client. This command may be contained in the connection request accepted in the step S1103. The thread transfers the accepted command to the main program for carrying out video processing.

If the command is an operation command, the main program proceeds to a step S1106. In the step S1106, the main program executes a reconfiguration process related to video capture, encoding, transmission, and so forth, so as to process the command. The main program delivers an execution result (code indicative of success or failure) of the process corresponding to the command to the client-associated thread. In response to this, the client-associated thread sends the execution result of the process corresponding to the command to the viewer 102 as the client.

On the other hand, in a step S1107, the video capture thread and the encoding thread control the video capture board 304 to capture video data, i.e. a full field-of-view image at predetermined time intervals. Further, the video capture thread and the encoding thread carry out video processing by transforming or correcting the video image according to the optical characteristics of the optical system provided in the camera apparatus 310. Then, the video capture thread and the encoding thread store the processed video image in the memory 302, as latest full field-of-view image data.

In a step S1108, the video capture thread and the encoding thread deliver the full field-of-view image data to all client-specific threads (client-associated threads).

In a step S1111, each client-associated thread determines whether or not a transmission request for video frames has been received from the associated viewer 102. If the transmission request has been received, the associated thread cuts out an image for distribution from the full field-of-view image 1000 based on field-of-view information associated with the viewer 102, and distributes the cut-out image to the viewer 102. In doing this, needless to say, the thread applies a codec, an image quality (compression ratio), a distribution protocol, etc. which are designated by the viewer 102 to the distribution. After execution of the steps S1110 and S1111, the client-associated thread returns to the step S1109 to enter the standby state for accepting commands from the client.

If a command for termination of the connection is received from the client in the step S1109, the client-associated thread transmits the command to the main program. Then, in a step S1112, the thread terminates itself.

Figure 12:
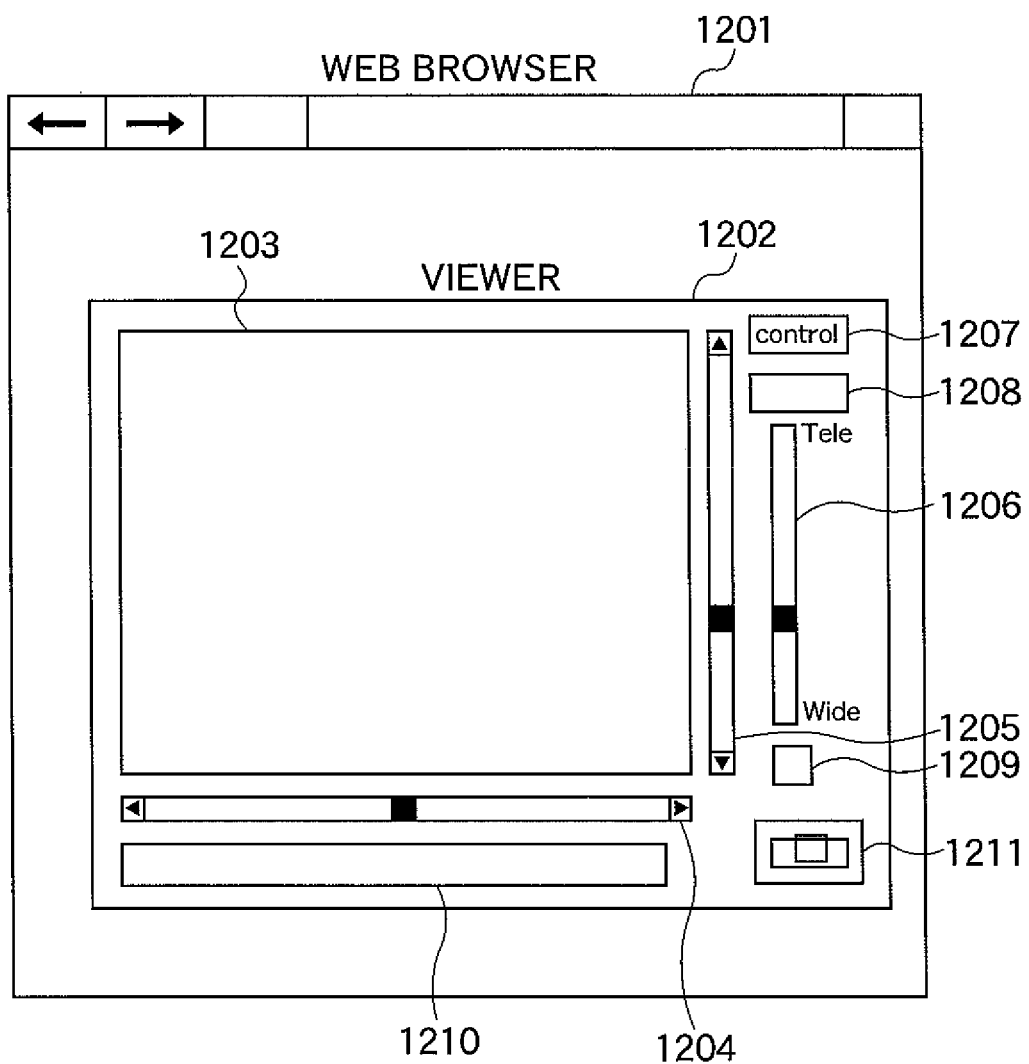
FIG. 12 is a view of an example of a user interface of the viewer in FIG. 1.

FIG. 12 is a view of an example of the user interface of a viewer 102 appearing in FIG. 1. Reference numeral 1201 designates a display window of the Web browser program. Reference numeral 1202 designates the user interface (UI) of the viewer program operating in the display window 1201. This user interface is provided with various operating controls.

Reference numeral 1203 designates a video display area for displaying a video image from a camera server 101 in the step S701 or S811. A pan slide bar 1204 is a scroll bar for a panning operation (a lateral shift of the shooting range of the camera apparatus 310). A tilt slide bar 1205 is a scroll bar for a tilting operation (a vertical shift of the shooting range of the camera apparatus 310). A zoom slide bar 1206 is a scroll bar for a zooming operation.

Reference numeral 1207 designates a button for requesting the camera operation rights. Reference numeral 1208 designates a display area for displaying the status of the camera operation rights. Reference numeral 1209 designates a button for backlight correction. Reference numeral 1210 designates a select box for preset selection. Reference numeral 1211 designates a designation button for designating a field-ofview position directly from a panorama image. It is preferred that the user interface is also provided with operating controls, such as a camera selection menu for selecting one of the camera servers 101, and an image size changing menu for changing the image size (see FIG. 13).

When one of these operating controls including the slide bars and the operation buttons is operated, control information corresponding to the operation is sent to the associated camera server 101 (steps S701 and S702). The sent control information is received by the camera server 101 in the step S807.

Further, each of the operating controls provided on the user interface is assigned one of the electronic PTZ mode and the mechanical PTZ emulation mode as a video mode. It should be noted that the correspondences between operating controls and the modes are held e.g. in a mapping table. The mapping table is stored e.g. in the memory 402.

FIG. 13 is a view of an example of the mapping table stored in the memory 402 in FIG. 4. In this example, the select box 1210 for preset selection, the video display area 1203, and so forth are assigned the electronic PTZ mode. On the other hand, the pan slide bar 1204, the tilt slide bar 1205, and so forth are assigned the mechanical PTZ emulation mode. The CPU 401 can identify a video mode corresponding to an operated operating control. The CPU 401 adds mode designating information indicative of the identified video mode to control information and then sends the control information to the camera control server 501 or the video server 502.

According to the present embodiment, each camera server 101 has a first mode for cutting out a part of a captured video image and a second mode for generating images by interpolation based on cut-out images. For example, the first mode is a video mode (e.g. the electronic PTZ mode) for electronically generating a panned, tilted, or zoomed video image. The second mode is a video mode (e.g. the mechanical PTZ emulation mode) for generating intermediate video images based on video images cut-out before and after application of a panning, tilting, or zooming operation. The camera server 101 switches between the first mode and the second mode based on control information sent from the viewer 102. Therefore, it is possible to enhance flexibility in distribution mode switching or video mode switching in the image distribution system. More specifically, the operator of the viewer 102 is enabled to view a video image distributed in the suitably switched video mode.

For example, the camera server 101 may switch between the first mode and the second mode based on explicit mode designating information sent from a viewer 102. In this case, since the camera server 101 is only required to perform mode switching based on the mode designating information, it is possible to facilitate control of the camera server 101.

For example, each viewer 102 may determine the mode designating information in response to operations of operating controls provided on the user interface displayed on the display device 410. It is desirable that when an operating control for panning, tilting, or zooming is operated, an additional video image being panned, tilted, or zoomed (intermediate image) is displayed. In this case, the mode designating information designates the second mode as the mode to be selected. On the other hand, when the select box 1210 for preset selection is operated, for example, intermediate video images are generally considered unnecessary, and hence, in this case, the mode designating information designates the first mode as the mode to be selected.

For example, each viewer 102 may store a mapping table in which is registered the correspondences between commands (e.g. commands input via respective operating controls) and the modes to be applied e.g. in the memory 402. In this case, the viewer 102 can easily select a mode from the mapping table based on a command to be sent.

Next, a description will be given of a second embodiment of the present invention.

In the first embodiment, the viewer 102 designates a mode e.g. using the table. In this case, it is necessary to change the software of the viewer 102. However, in some cases, mode designation may be more easily performed by changing the software of the camera server 101. In view of this, in the second embodiment, a description will be given of the case where a mode is determined by the camera server 101. Description of component parts and elements identical to those in the first embodiment is omitted so as to avoid repetitive or duplicate description.

Figure 14:
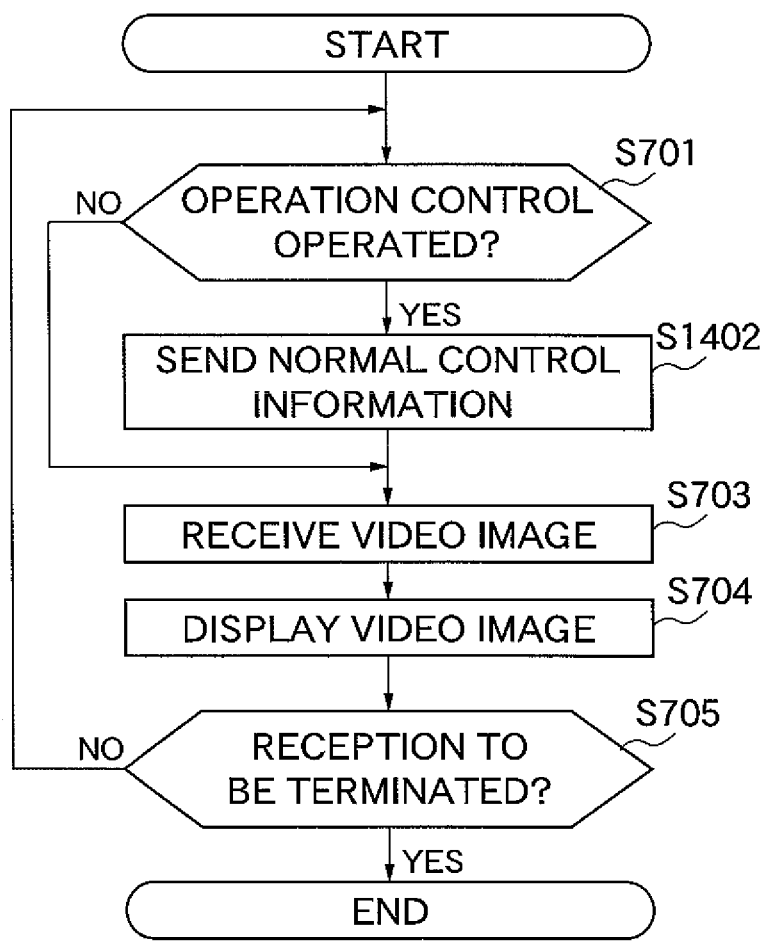
FIG. 14 is a flowchart of a control process executed by each viewer in FIG. 1 in a second embodiment of the present invention, in place of the control process in FIG. 7.

FIG. 14 is a flowchart of a control process executed by each viewer 102 in FIG. 1 in place of the control process in FIG. 7 in the second embodiment. The control process is distinguished from that in FIG. 7 in that a step S1402 is provided in place of the step S702. In the step S1402, the CPU 401 sends normal control information (e.g. a request or a command) corresponding to an operation to the camera server 101. The term "normal control information" is intended to mean control information which does not contain the above-described mode designating information. More specifically, in the second embodiment, the viewer 102 does not give an explicit instruction for mode switching. For this reason, the viewer 102 need not hold a mapping table storing the correspondences between the operating controls and the video modes. However, the normal control information can function as implicit mode designating information.

Figure 15:
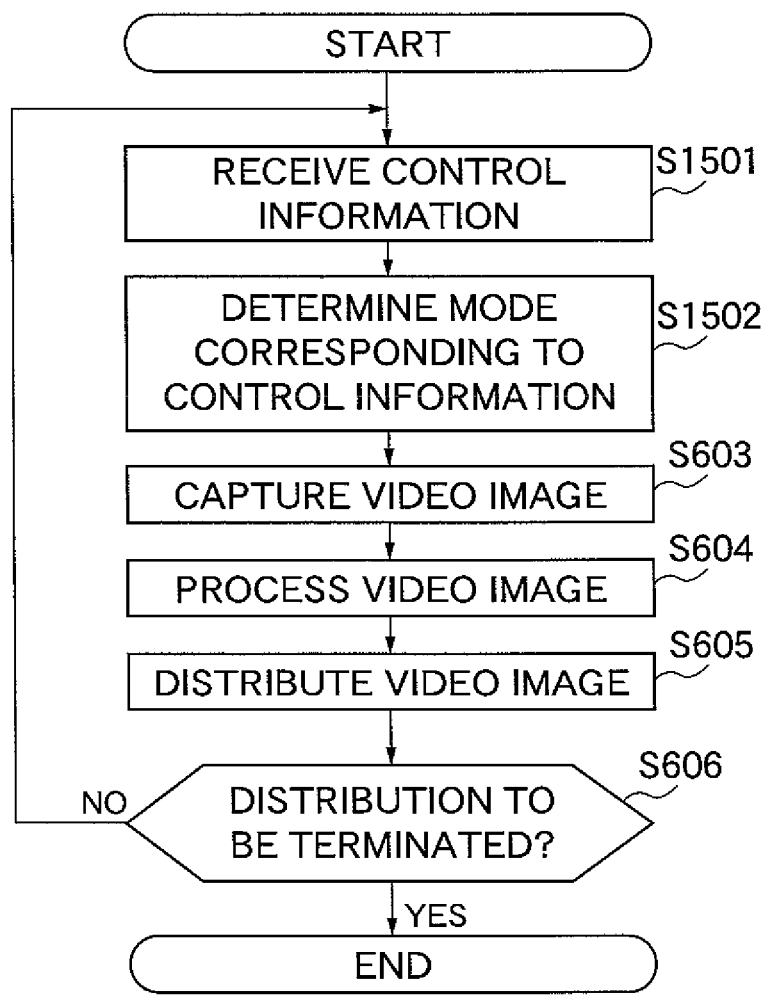
FIG. 15 is a flowchart of a control process executed by each camera server in FIG. 1, in place of the control process in FIG. 6.

FIG. 15 is a flowchart of the control process executed by each camera server 101 in FIG. 1 in place of the control process in FIG. 6. The present process is distinguished from the process in FIG. 6 in that the steps S601 and S602 are replaced by steps S1501 and S1502, respectively. In the step S1501, the CPU 301 receives normal control information sent from a viewer 102. In the step S1502, the CPU 301 identifies a video mode corresponding to the received control information.

For example, the memory 302 stores a mapping table in which are registered the correspondences between control information items sent from the viewer 102 and the video modes to be applied. In this case, the CPU 301 can identify a video mode corresponding to the received control information item from the mapping table.

Insofar as software is concerned, the above-described camera control server 501 determines a video mode by itself upon reception of control information, such as a camera control request (step S906).

FIG. 16 is a view of an example of the mapping table stored in the memory 302 in FIG. 3 in the second embodiment. In this example, items of the control information are each associated with a video mode in a one-to-one correspondence. This enables the camera control server 501 to identify specific control information, and identify a video mode associated with the identified control information based on the mapping table.

According to the present embodiment, the camera server 101 can perform flexible video mode switching based on the specific control information received from a viewer 102. The second embodiment is more advantageous than the first embodiment in that a mechanism or device for sending an explicit instruction for video mode switching is not necessary. Further, it is to be understood that with part of the configuration identical to that of the first embodiment, the second embodiment can provide the same advantageous effects as provided by the first embodiment.

Figure 17:
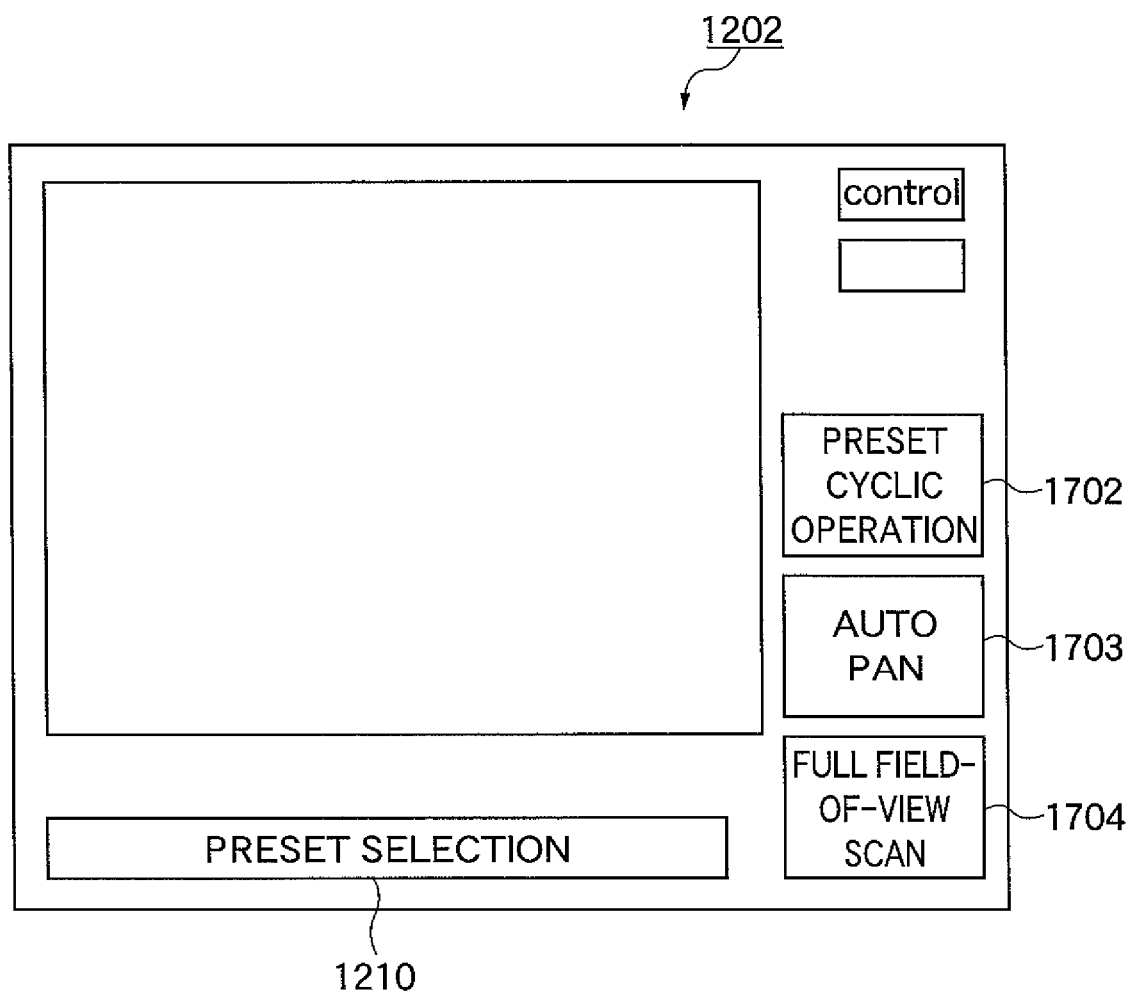
FIG. 17 is a view of an example of a user interface used in place of the user interface in FIG. 12.

FIG. 17 is a view of an example of a user interface used in place of the user interface in FIG. 12. The user interface (UI) in FIG. 17 is distinguished from the UI in FIG. 12 in that the video modes are mapped to relatively roughly separated operating controls. For example, a select box 1210 for preset selection and a button 1702 for preset cyclic operation may be associated with the electronic PTZ mode, and a button 1703 for automatic panning and a button 1704 for full field-of-view scanning may be associated with the mechanical PTZ emulation mode.

In these cases, the mapping method may be identical to that in the first embodiment or in the second embodiment. It should be noted that "automatic panning" is intended to mean processing for automatically executing panning by a predetermined amount. Further, "preset cyclic operation" is intended to mean processing for sequentially accessing predetermined camera servers 101 or processing for sequentially displaying predetermined areas within a full field-of-view image. "Full field-of-view scanning" is intended to mean processing for sequentially displaying all areas within a full field-of-view image.

Next, a description will be given of a third embodiment of the present invention.

In the first and second embodiments, a viewer 102 or a camera server 101 controls an associated camera in a suitable mode in response to an operating control or an operation command.

In the third embodiment, a description will be given of a case where, as in the first embodiment, a suitable mode is designated in response to operation of the user interface of a viewer, and an associated camera is controlled in accordance with the designated mode, and particularly of the relationship between issuing of each camera control command or video control command, associated processing, and the viewer interface. It should be noted that description of component parts and elements in the third embodiment identical to those of the first or second embodiment is omitted so as to avoid repetition and duplication.

Figure 18:
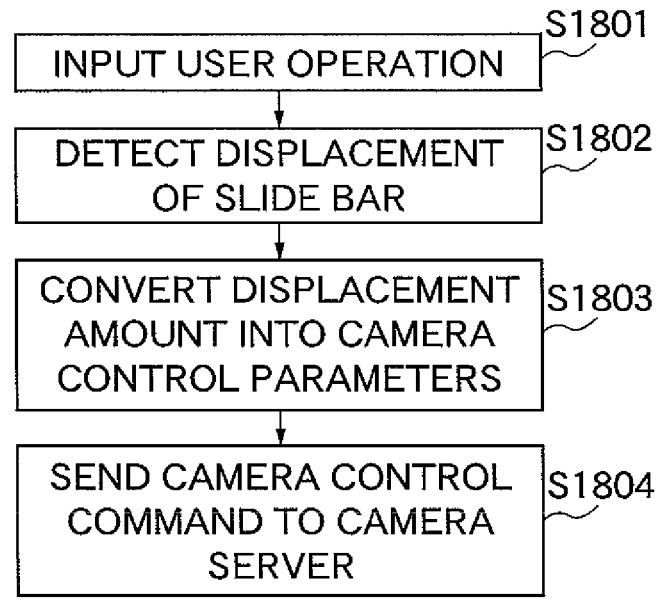
FIG. 18 is a flowchart of a command issuing process executed by each viewer in FIG. 1.

FIG. 18 is a flowchart of a process in which a viewer 102 establishes connection to the video server 502 and the camera control server 501, receives an operation from the user of the viewer 102, and issues a panning operation command to the camera control server 501 and the video server 502. Basic operations carried out in this process are identical to those carried out in the steps S807, S808, and S809. Hereafter, a description will be given of operations carried out by the viewer 102 when the user operates the pan slide bar 1204 disposed on the user interface of the viewer program (see FIG. 12).

Although FIG. 18 illustrates a case where the pan slide bar 1204 is used, the similar description can also be applied to a case where a tilting angle parameter is designated using the tilt slide bar 1205, and a case where the zoom slide bar 1206 is used.

In a step S1801, the viewer 102 receives a user operation. Specifically, the CPU 401 detects that the user has selected (clicked) or dragged the pan slide bar 1204 on the user interface of the viewer 102 using the mouse 408 or the keyboard 409, and issues an associated instruction.

In a step S1802, the CPU 401 detects displacement of the pan slide bar 1204. A method of detecting displacement of a slide bar can be realized e.g. by a known technique employed by a window system providing the slide bar. The method can be briefly described as follows:

(1) First, when a slider button on the slide bar is dragged, an absolute position is designated. The CPU 401 detects a current slider button position relative to the maximum displacement amount of the slider button on the slide bar, and converts data of the detected position into the absolute position. For example, the absolute position is set to a position 20% of the maximum displacement amount away from the left end of the slide bar in a predetermined plus direction, e.g. in the rightward direction.

(2) When a point on a blank portion (portion except for the slider button) on the slide bar is clicked as well, the absolute position is designated. Clicking on a point on a blank portion has the same effect as that of dragging the slider button to the point.

(3) When one of arrows disposed at the opposite ends of the slide bar is clicked, a relative position is designated. A predetermined fixed value is set to a displacement amount, by configuring the viewer 102 in advance or exchanging capability information with the camera server 101. For example, when a right arrow is operated, an angle or the like of the camera apparatus 310 is changed by 10% in the rightward (plus) direction.

(4) Arrow keys on the keyboard are sometimes assigned to the functions of the slider button on the slide bar positioned horizontally or vertically. In this case, pressing an arrow key on the keyboard has the same effect as that of clicking one of the arrows disposed at the opposite ends of the slide bar. Further, a displacement amount of angle or the like of the camera apparatus 310 may be adjusted by combination with a filter key, such as a shift key.

In a step S1803, the CPU 401 converts the obtained displacement amount into a panning angle parameter. The CPU 401 acquires information on pan controllable angle range from the camera server 101 in advance, and converts the acquired pan controllable angle range into the maximum displacement amount of the slider button on the pan slide bar 1204. Then, the CPU 401 converts the displacement amount detected in the step S1802 into a camera control parameter, such as the panning angle parameter, based on the maximum displacement amount.

In the following description, it is assumed that the entire pan controllable angle range is 150 degrees (e.g. 75 degrees from the front in the leftward direction and 75 degrees from the front in the rightward direction). The pan controllable angle range is changed during capability information exchange executed when connection to the camera server 101 is established. The pan controllable angle can also be changed when a camera controllable range change event occurs.

(1) When the slider button on the slide bar is dragged (absolute position designation), the CPU 401 converts the detected absolute position into an absolute pan position based on the pan controllable angle range (150 degrees). If a position 20% of the maximum displacement amount away from the left end of the slide bar in the predetermined direction is detected, the CPU 401 converts the detected absolute position into a parameter indicative of 30 degrees from the left end of the pan position. In other words, an angle of 45 degrees from the pan front position in the leftward (minus) direction is designated.

(2) This applies to the case (absolute position designation) where the blank portion (portion except for the slider button) on the slide bar was clicked on.

(3) In the case where one of the arrows disposed at the opposite ends of the slide bar is clicked once (relative position designation), the CPU 401 generates a panning angle parameter for increasing the panning angle by 15 degrees, because one click indicates 10% in the plus direction.

(4) This applies to the case where an arrow key or the like is operated on the keyboard.

In a step S1804, the CPU 401 sends the panning angle parameter to the camera server 101 together with a panning operation command. At this time, the CPU 401 refers to the mapping table described with reference to FIG. 13. Now that the pan slide bar was operated, the CPU 401 selects the mechanical PTZ emulation mode.

For example, a command issued for designating an increase in the panning angle by 15 degrees in the mechanical PTZ emulation mode can be written as follows:

"OperateCamera?pan=$d$+
1500&mode=smooth$PTZ$emuration"

Figure 19:
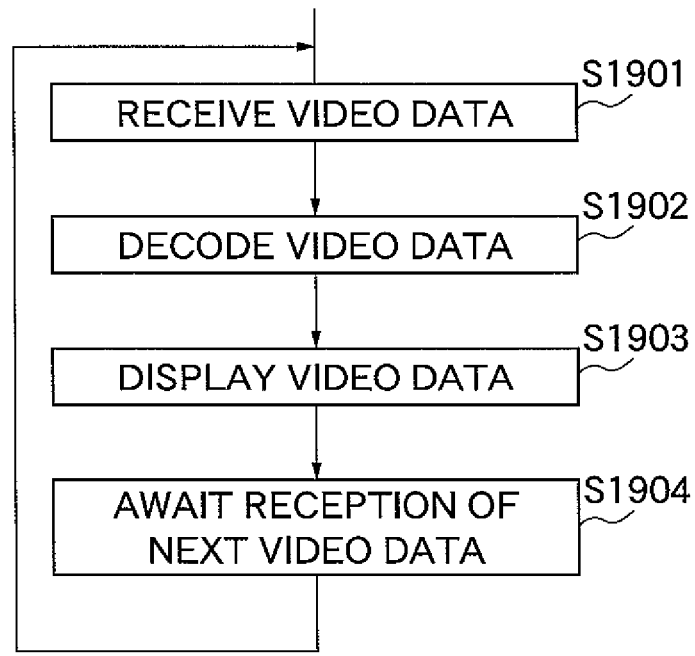
FIG. 19 is a flowchart of a display updating process executed by each viewer in FIG. 1.

FIG. 19 is a flowchart of a process in which the viewer 102 changes contents to be displayed on the user interface, in accordance with video distribution from the camera server 101. This process includes a step of displaying video data which the viewer 102 receives from the video server 502. Basic operations carried out by the viewer 102 to change contents to be displayed on the user interface are identical to those described referring to the steps S810 and S811. More specifically, steps of "reception of video data→decoding of the video data→video display" are repeatedly carried out.

Hereafter, a description will be given of an example of display by the viewer 102 in the case where an instruction is issued for designating an increase of the panning angle by 15 degrees in the mechanical PTZ emulation mode as in the case shown in FIG. 10. This instruction is realized e.g. by clicking the right arrow on the pan slide bar 1204 of the viewer 102.

When with a frame rate for video distribution set to 30 fps and the panning speed set to 60 degrees per second, the viewer 102 instructs the camera server 101 to increase the panning angle by 15 degrees, the camera server 101 distributes video frames while increasing the panning angle (i.e. shifting the field of view rightward) by two degrees per one frame.

60 (degrees/sec)/30 (fps)=2 (degrees/frame)

As a result, during distribution of 8 video frames by the camera server 101 after reception of the panning operation command, a video image which is being panned (subjected to the mechanical PTZ emulation) is continuously displayed in the video display area 1203 on the viewer 102 as follows:

first video frame (2-degree rightward shift from a field of view before execution of a panning operation);
second video frame (4-degree rightward shift from the field of view before execution of the panning operation);
third video frame (6-degree rightward shift from the field of view before execution of the panning operation);
fourth video frame (8-degree rightward shift from the field of view before execution of the panning operation);
fifth video frame (10-degree rightward shift from the field of view before execution of the panning operation);
sixth video frame (12-degree rightward shift from the field of view before execution of the panning operation);
seventh video frame (14-degree rightward shift from the field of view before execution of the panning operation); and
eighth video frame (15-degree rightward shift from the field of view before execution of the panning operation).

In a step S1901, the CPU 401 of the viewer 102 receives video data from the camera server 101. As a protocol for video reception, the RTP (Real-time Transfer Protocol) is used, for example. It should be noted that a response from the viewer 102 to a video update request may be received according to another protocol, such as the HTTP (Hyper Text Transfer Protocol).

In a step S1902, the CPU 401 decodes the received video data. At this time, the CPU 401 takes out additional information contained in the received video data or response, and reflects the same in the user interface of the viewer 102 as required.

For example, the responses from the camera server 101 to the panning operation command sent from the viewer 102 are as follows: a synchronous response indicating that the command has been received by the camera server 101 (i.e. the command was not rejected by control authority or the like) and an asynchronous response indicating that the panning angle or the field-of-view information has been changed on the camera server 101. When receiving such responses, the viewer 102 reflects the same in the user interface.

Change notifications sent from the camera server 101 in the present embodiment include panning angle information sent as attribute information on video data. Further, video data may be decoded using a differential CODEC, such as an MPEG-2, or a non-differential CODEC, such as a JPEG 2000.

In a step S1903, the CPU 401 displays the decoded video image. More specifically, the CPU 401 delivers the decoded video image to a display component of the window system corresponding to the video display area 1203 of the viewer 102, and instructs the display component to display the decoded video image. The CPU 401 can carry out scaling or clipping according to the size of the display component and a layout on the window system. It should be noted that the scaling and the clipping are known window system-related techniques, and hence description thereof is omitted.

In a step S1904, the CPU 401 awaits reception of next video data. When the next video data is expected to be distributed, the process returns to the step S1901, wherein the CPU 401 receives the video data as described hereinabove. In the step S1904, the CPU 401 may send a video update request to the camera server 101 as required.

Figure 20A:
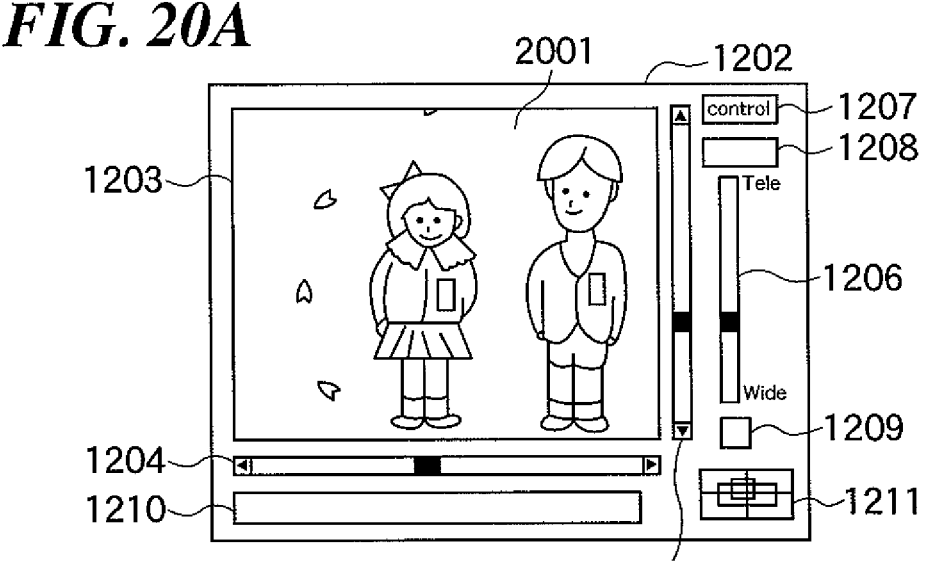
FIG. 20A is a view illustrating a first example of display by a viewer in FIG. 1.
Figure 20B:
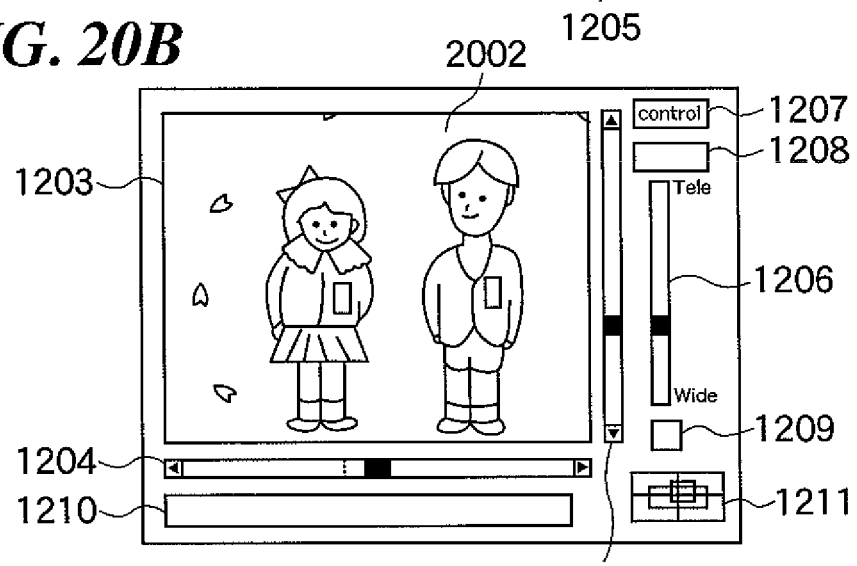
FIG. 20B is a view illustrating a second example of display by a viewer in FIG. 1.
Figure 20C:
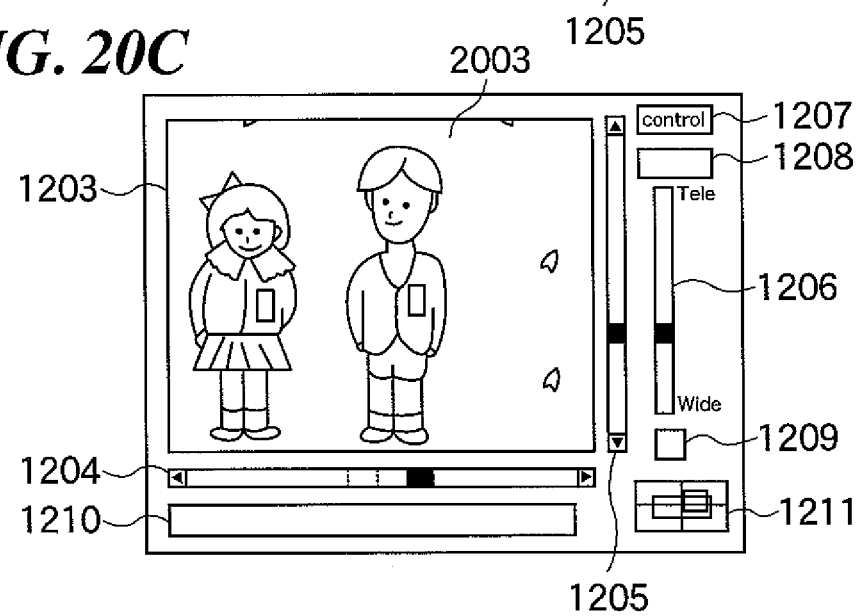
FIG. 20C is a view illustrating a third example of display by a viewer in FIG. 1.

FIGS. 20A to 20C are views showing changes in display which occur when a panning operation is performed. FIG. 20A shows a video image 2001 displayed on a display screen when a panning operation command was issued from the viewer 102 to the server 101 and just before the start of the panning operation. FIG. 20B shows a video image 2002 displayed on the display screen (first video frame with the panning angle changed by 2 degrees) immediately after the start of the panning operation. FIG. 20C shows a video image 2003 displayed on the display screen (eighth video frame with the panning angle changed by 15 degrees) after completion of the panning operation.

As described above, the viewer 102 not only displays video images generated during execution of panning by the camera apparatus 310, but also takes out panning angle information contained in received image data and reflects the information in the slider button position on the slide bar.

Figure 21:
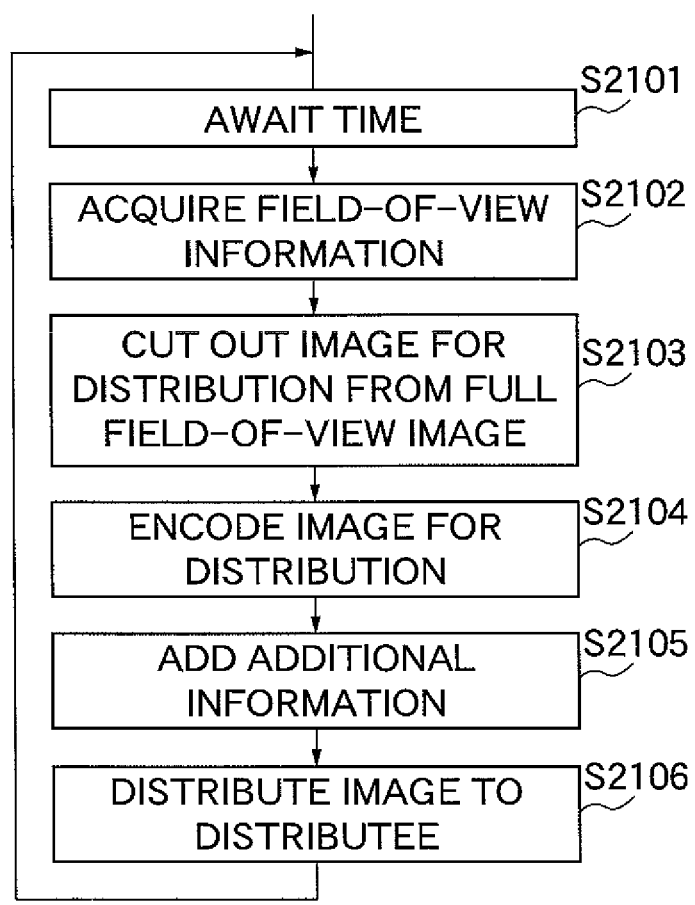
FIG. 21 is a flowchart of a video data distribution process executed by each camera server.

FIG. 21 is a flowchart of a video data distribution process executed by the camera server 101. The video data distribution process in the mechanical PTZ emulation mode, which will be described hereafter, is carried out based on field-of-view information (information reflecting the state of camera control, described with reference to FIG. 10) designated by the camera control server 501. Basic operations carried out in this process are identical to those described referring to the steps S1107, S1108, and S1111 in FIG. 11.

In the following, a detailed description will be given of a distribution procedure and distribution timing of video images to be distributed particularly in the mechanical PTZ emulation mode. It is to be understood that the present invention can be applied even to cases where a video capture rate and a frame rate for video distribution do not match each other. For example, when a video image (full field-of-view image) captured at a rate of 15 fps is to be distributed at a distribution frame rate of 30 fps, it is required to interpolate frames. In this case, the camera server 101 may distribute two consecutive frames of video images cut out from the identical full field-of-view image. These two frames are video images cut out based on field-of-view information, and hence they are sometimes not completely identical.

In a step S2101, the CPU 301 awaits arrival of a time for video distribution according to a preset frame rate. For example, when the frame rate is set to 30 fps, the CPU 301 executes the video distribution process at time intervals of about 30 msec. Different frame rates may be used on a distributee-by-distributee (viewer-by-viewer) basis. Further, a frame rate need not be constant. This is because the CPU 301 can distribute a video image whenever a video update request is received from a distributee (viewer). In this case, the CPU 301 awaits reception of a video update request in the step S2101.

In a step S2102, the CPU 301 acquires field-of-view information based on camera control information designated by the viewer 102. The update of the field-of-view information is performed by the camera control server 501 of the camera server 101 (see FIG. 10). When receiving a new camera operation command from the viewer, the CPU 301 implementing the camera control server 501 also carries out compiling or merging of camera control information as required.

In a step S2103, the CPU 301 cuts out an image for distribution from the latest full field-of-view image based on the field-of-view information. A full field-of-view image is generally captured by the camera apparatus 310 and the video capture board 304 in timing independent of the frame rate.

In a step S2104, the CPU 301 encodes the image cut out for distribution based on the field-of-view information, in accordance with the distributee. This is because different CODECs (JPEG 2000, MPEG-2, etc.) and different image qualities (compression ratio, etc.) can be required by different distributees.

In a step S2105, the CPU 301 adds additional information to the encoded video data. The additional information includes time stamps (capture time associated with the full field-of-view image, distribution time, etc.), pan/tilt/zoom values, field-of-view information (cutting position), encoding parameters (compression ratio, etc.), access control information (copyright protection information, etc.), face detection information, and sensor detecting information.

These pieces of information may be embedded in the encoded video data, or added to the head or tail of the video data. For example, when the image data has a JPEG format, the CPU 301 adds the additional information as an APP0 marker of JFIF (JPEG FILE Interchange Format).

In a step S2106, the CPU 301 sends the video data for distribution to the distributee (viewer). As a distribution protocol, the RTP may be used, for example. Further, the HTTP may be used for sending a response to the video update request received from the viewer 102. Thereafter, the steps S2101 to S2106 are repeatedly carried out.

According to the present embodiment, a suitable operation mode corresponding to an operation of the graphical user interface (GUI) of the viewer 102 can be designated for a camera server. In particular, the present embodiment is characterized by the relationship between issue of each camera control command or video control command, associated processing, and the viewer GUI.

For example, although in the present embodiment, the viewer 102 converts the displacement amount of an operating control into a panning angle parameter or a tiling angle parameter, this is not limitative, but this conversion process may be executed e.g. by the camera control server 501. In this case, the viewer 102 only has to send the displacement amount of the operating control to the camera control server 501.

In the present embodiment, the viewer 102 carries out a camera operation in the mechanical PTZ emulation mode, using the pan slide bar 1204. However, the operating control of the viewer 102 is not limited to the pan slide bar 1204.

For example, the video display area 1203 may be used as one of the operating controls by configuring the viewer 102 such that when the video display area 1203 is clicked, the CPU 401 instructs the camera server 101 to operate in the mechanical PTZ emulation mode. In this case, however, the method of detecting displacement of the operating control, the method of converting the displacement amount of the operating control into panning and tilting angle parameters, and the like method will be different from those in the above-described embodiment. For example, the viewer 102 can be configured such that when some position in the video display area 1203 is clicked, the CPU 401 determines a displacement amount in the panning direction and a displacement amount in the tilting direction at the same time.

Now, as a typical example, there is envisaged a method of controlling the camera apparatus 310, in response to a click on a specific position within the video display area 1203, such that the specific position is brought to a central position of the video display area 1203. In this case, the CPU 401 calculates the distance (in the number of pixels) between the current central position and the specific position. Next, the CPU 401 converts the calculated distance into panning and tilting angle parameters. It should be noted that the CPU 401 may calculate these parameters, also using the current zoom magnification.

For example, in the case where a panning angle is to be relatively increased by 15 degrees, and a tilting angle is to be relatively reduced by 5 degrees, the CPU 401 issues the following camera operation command:

"OperateCamera?pan=d+
1500&mode=smoothPTZemuration".

Hereafter, other embodiments according to the present invention will be described.

In the first to third embodiments, each camera server 101 performs image processing, such as coordinate transformation and image correction, on a captured video image to thereby generate a corrected full field-of-view image. The camera server 101, however, may carry out the image processing on a video image to be distributed to a viewer 102. As is apparent from FIG. 10, a full field-of-view image is larger in size than a video image for distribution. In general, the amount of image processing and time required for the image processing are proportional to image size. Therefore, from the viewpoint of reduction of the amount and time of processing, it is preferable to perform image processing on the video image to be distributed.

Although in the above described embodiments, the camera server 101 is described assuming that the rate of mechanical PTZ emulation is preset, this rate may be dynamically or additionally changed. For example, a viewer 102 may designate the rate e.g. when transmitting a camera control command.

According to the above described embodiments, the description is given of the cases where the compression ratio (image quality) of a distributed video image is set on a viewer-by-viewer basis, by way of example. However, the compression ratio (image quality) may be set on a camera server-by-camera server basis. Further, the camera server 101 may change video parameters including the compression ratio (image quality) for each video mode.

Although in the above described embodiments, each video mode is mapped to one or more operating controls provided on the UI of the viewer 102, objects to which each video mode are mapped in the present invention are not limited to operating controls. For example, each video mode may be mapped to an operation style for operating an operating control. In this case, the viewer 102 can select a different video mode e.g. depending on whether the slider button on the pan slide bar 1204 is dragged or one of the arrows vertically disposed at the opposite ends of the pan slide bar 1204 is operated. This is advantageous in that the operator of the viewer 102 is allowed to select a desired video mode simply by changing an operation style for operating the operating control.

According to the above described embodiments, the camera operation rights request button 1207 and the display area 1208 for displaying the status of the camera operation rights are provided on the UI. However, in the video distribution system according to the present invention, exclusive control based on the operation rights is not essential, and hence the camera operation rights request button 1207 or the like may be omitted.

It should be noted that whether or not the camera operation rights are granted may be reflected in the mechanical PTZ emulation. For example, the field of view of a viewer 102 which is granted the camera operation rights may be forcibly applied to another viewer which is not granted the camera operation rights.

Although in the above described embodiments, the mapping table stores the correspondences between the operating controls and the video modes, it is to be understood that the mapping table may be customized on an operator-by-operator basis. This is because some operators desire that the correspondences between the video modes and the operating controls are customized. Alternatively, mapping tables may be provided on a user group-by-user group basis. These mapping tables may be different depending on the difference in a privilege level or whether or not the operation rights are granted.

According to the above described embodiments, a video mode is mapped to each of the operating controls finely separated for use in the respective camera control operations, such as panning, tilting, and zooming. However, the operating controls are not required to be thus finely separated.

Although in the second embodiment, the camera server 101 determines a video mode based on specific control information sent from a viewer 102, it is to be understood that the camera server 101 may determines a video mode based on other conditions. For example, let it be assumed that an image area video distribution of which is restricted is set in the full field-of-view image 1000. In this case, if a pan request or a tilt request from the viewer 102 indicates requesting a camera operation that will move across the image area under restriction, the camera server 101 distributes a video image in the electronic PTZ mode. That is, the camera server 101 applies the electronic PTZ mode to video distribution of at least the image area under restriction. On the other hand, it is preferable that the camera server 101 applies the mechanical PTZ emulation mode to an image area without restriction on video distribution thereof.

The camera server 102 generates a log (history information) of control information received from one or more viewers 102, and then stores the generated log e.g. in the HD device 307. Further, the camera server 102 statistically processes cases indicative of correspondences between the control information items and operation commands recorded in the log, and determines a video mode having been selected most often in the past in association with the received control information, as the next video mode. The camera server 102 may also determine the rate of operation in the mechanical PTZ emulation mode, etc. based on the log.

Each viewer 102 may set various parameters related to video distribution by the associated or connected camera server 102. As such parameters, there may be mentioned the number of a TCP port for use in communication for camera control, a COM (serial) port number, a shutter speed, and the presence/absence of camera control-related log information and its log file name. Further, there may also be mentioned the number of a TCP port for use in video-related communication, the frame rate of a video image, a Q-factor for determining the quality of compression (compression ratio), the screen size of original data before compression, and a maximum connection time period per one viewer are also included in the parameters. Moreover, there may be mentioned the number of users awaiting the operation rights to be granted, a time period over which one viewer can exclusively own the operation rights, and the maximum number of clients allowed to establish connection for camera control.

The present invention may either be applied to a system composed of a plurality of apparatuses or to a single apparatus.

Further, it is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk such as a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed the embodiments. The scope of the following claims is to be accorded the broadest interpretation so as to encompass all such modifications and equivalent structures and functions.

This application claims the benefit of Japanese Patent Application Nos. 2005-332058, filed Nov. 16, 2005, and 2006-220643, filed Aug. 11, 2006 which are hereby incorporated by reference herein in their entirety.

What is claimed is:

1. A video distribution apparatus that is connected via a network to a viewer apparatus that displays a video image, comprising:
   an extraction device that extracts image data of an area from the video image captured by a video capture device;
   a setting device that sets a restricted area in the video image captured by the video capture device;
   a determination unit that determines whether or not an intermediate area between a first area and a second area in the video image overlaps with the restricted area in the video image captured by the video capture device; and
   a distribution device that distributes image data of at least one intermediate area between the first area and the second area in the video image and extracted from the video data to the viewer apparatus via the network after distributing image data of the first area and before distributing image data of the second area in the video image and extracted from the video data captured by the video capture device in a case where the area extracted from the video image captured by the video capture device is changed from the first area to the second area and said determination unit determines that the at least one intermediate area between the first area and the second area in the video image does not overlap with the restricted area, and distributes the image data of the second area in the video image extracted from the video data without distributing image data of any intermediate area between the first area and the second area in the video image to the viewer apparatus via the network in a case where the area extracted from the video image captured by the video capture device is changed from the first area to the second area and said determination unit determines that the at least one intermediate area between the first area and the second area in the video image overlaps with the restricted area.

2. An apparatus according to claim 1, wherein said distribution device distributes the image data of the at least one intermediate area to the viewer apparatus via the network in accordance with a moving speed for moving the area from the first area to the second area.

3. An apparatus according to claim 1, wherein said distribution device distributes image data of more than one intermediate areas between the first area and the second area, the number of the more than one intermediate areas being determined in accordance with a moving speed for moving the area from the first area to the second area.

4. An apparatus according to claim 1, wherein the distribution device distributes the image data of the at least one intermediate area and a shooting direction for shooting the image data of the at least one intermediate area.

5. An apparatus according to claim 1, wherein said extraction device generate the image data of the at least one intermediate area between the first area and the second area by interpolating plural frames of video images captured by the video capture device.

6. A method of controlling a video distribution apparatus that is connected via a network to a viewer apparatus that displays a video image, comprising:
   extracting image data of an area from the video image captured by a video capture device;
   setting a restricted area in the video image captured by the video capture device;
   determining whether or not an intermediate area between a first area and a second area in the video image overlaps with the restricted area in the video image captured by the video capture device; and
   distributing image data of at least one intermediate area between the first area and the second area in the video image and extracted from the video data to the viewer apparatus via the network after distributing image data of the first area and before distributing image data of the second area in the video image and extracted from the video data captured by the video capture device in a case where the area extracted from the video image captured by the video capture device is changed from the first area to the second area and the at least one intermediate area between the first area and the second area in the video image does not overlap with the restricted area, and distributing the image data of the second area in the video image extracted from the video data without distributing image data of any intermediate area between the first area and the second area in the video image to the viewer apparatus via the network in a case where the area extracted from the video image captured by the video capture device is changed from the first area to the second area and the at least one intermediate area between the first area and the second area in the video image overlaps with the restricted area.

7. A method according to claim 6, wherein the image data of the at least one intermediate area is distributed to the viewer apparatus via the network in accordance with a moving speed for moving the area from the first area to the second area.

8. A method according to claim 6, comprising distributing image data of more than one intermediate areas between the first area and the second area, the number of the more than one intermediate areas being determined in accordance with a moving speed for moving the area from the first area to the second area.

9. A method according to claim 6, wherein the image data of the at least one intermediate area is distributed with a shooting direction for shooting the image data of the at least one intermediate area.

10. A method according to claim 6, wherein the image data of the at least one intermediate area between the first area and the second area is generated by interpolating plural frames of video images captured by the video capture device.

11. A non-transitory computer-readable storage medium for storing a computer program executed by a video distribution apparatus that is connected via a network to a viewer apparatus that displays a video image, comprising
   an extraction module for extracting image data of an area from the video image captured by a video capture device;
   a setting module for setting a restricted area in the video image captured by the video capture device;
   a determination module for determining whether or not an intermediate area between a first area and a second area in the video image overlaps with the restricted area in the video image captured by the video capture device; and
   a distribution module for distributing image data of at least one intermediate area between the first area and the second area in the video image and extracted from the video data to the viewer apparatus via the network after distributing image data of the first area and before distributing image data of the second area in the video image and extracted from the video data captured by the video capture device in a case where the area extracted from the video image captured by the video capture device is changed from the first area to the second area and said determination module determines that the at least one intermediate area between the first area and the second area in the video image does not overlap with the restricted area, and distributing the image data of the second area in the video image extracted from the video data without distributing image data of any intermediate area between the first area and the second area in the video image to the viewer apparatus via the network in a case where the area extracted from the video image captured by the video capture device is changed from the first area to the second area and said determination module determines that the at least one intermediate area between the first area and the second area in the video image overlaps with the restricted area.

12. A non-transitory computer-readable storage medium according to claim 11, wherein said distribution module distributes the image data of the at least one intermediate area to the viewer apparatus via the network in accordance with a moving speed for moving the area from the first area to the second area.

13. A non-transitory computer-readable storage medium according to claim 11, wherein said distribution module distributes the image data of the at least one intermediate area and a shooting direction for shooting the image data of the at least one intermediate area.

14. A non-transitory computer-readable storage medium according to claim 11, wherein said extraction module generate the image data of the at least one intermediate area between the first area and the second area by interpolating plural frames of video images captured by the video capture device.

* * * * *

UNITED STATES PATENT AND TRADEMARK OFFICE
CERTIFICATE OF CORRECTION

PATENT NO.       : 8,429,703 B2
APPLICATION NO.  : 11/558964
DATED            : April 23, 2013
INVENTOR(S)      : Takahiro Kurosawa Page 1 of 1

It is certified that error appears in the above-identified patent and that said Letters Patent is hereby corrected as shown below:

On the title page, item (73) Assignee should read as follows: Canon Kabushiki Kaisha, Tokyo (JP)

Signed and Sealed this
Twenty-fifth Day of June, 2013

Teresa Stanek Rea
*Acting Director of the United States Patent and Trademark Office*